(12) United States Patent
Osakada et al.

(10) Patent No.: US 8,389,656 B2
(45) Date of Patent: Mar. 5, 2013

(54) COPOLYMER AND METHOD FOR PRODUCING SAME

(75) Inventors: Kohtaro Osakada, Yokohama (JP); Daisuke Takeuchi, Yokohama (JP); Osamu Ihata, Ichihara (JP); Hirofumi Johoji, Ichihara (JP); Kenji Sogo, Ichihara (JP)

(73) Assignees: Tokyo Institute of Technology, Tokyo (JP); Sumitomo Chemical Company, Limited, Tokyo (JP)

( * ) Notice: Subject to any disclaimer, the term of this patent is extended or adjusted under 35 U.S.C. 154(b) by 193 days.

(21) Appl. No.: 13/071,754

(22) Filed: Mar. 25, 2011

(65) Prior Publication Data

US 2011/0245440 A1    Oct. 6, 2011

(30) Foreign Application Priority Data

Mar. 30, 2010 (JP) .................... 2010-079321

(51) Int. Cl.
*C08F 4/42* (2006.01)

(52) U.S. Cl. ...................................... 526/172

(58) Field of Classification Search .............. 526/172
See application file for complete search history.

(56) References Cited

U.S. PATENT DOCUMENTS

2002/0045536 A1* 4/2002 Sita et al. ................. 502/104

FOREIGN PATENT DOCUMENTS

JP         2006193554 A     7/2006

OTHER PUBLICATIONS

W.H. McCarty, et al. "Polymerization of Vinylcyclohexane with TiCl3-Al(C2H5)3 Catalysts" Journal of Polymer Science: Part A, vol. 3, pp. 4029-4046, (1965).

M. Fujita et al., "Synsthesis and Characterization of Alternating and Multiblock Copolymers from Ethylene and Cyclopentene" Macromolecules, No. 35, pp. 9640-9647, (2002).
S.J. McLain et al., "Communications to the Editor" Macromolecules, No. 31, pp. 6705-6707 (1998).
W.H. McArty, et al. "Polymerization of Vinylcyclohexane with TiCl3-Al(C2H5)3 Catalysts" Journal of Polymer Science: Part A, vol. 3, pp. 4029-4046, (1965).
S. Borkar et al.,"Copolymerization of Ethene with Styrene Derivatives, Vinyl Ketone, and Vinylcyclohexane Using a (Phosphine-sulfonate)palladium(II) System: Unusual Functionality and Solvent Tolerance", Organometallics, vol. 27, pp. 3331-3334, (2008).

* cited by examiner

*Primary Examiner* — Kuo-Liang Peng
(74) *Attorney, Agent, or Firm* — Panitch Schwarze Belisario & Nadel LLP

(57) ABSTRACT

A copolymer and method for providing it are provided, which includes a monomer unit represented by the following formula (1) and an olefin unit:

[Chem. 1]

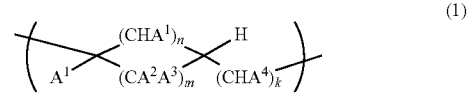

(1)

wherein: each of $A^1$, $A^2$, $A^3$, and $A^4$ independently represents a hydrogen atom, a halogen atom, an alkyl group, an aralkyl group, an aryl group, a silyl group, a siloxy group, an alkoxy group, an aralkyloxy group, an aryloxy group, an amino group, an amide group, an imide group, or a hydrocarbon thio group; which group may have a substituent; and each of m, n, and k is independently an integer in a range of 2 to 20.

12 Claims, No Drawings

COPOLYMER AND METHOD FOR PRODUCING SAME

This Nonprovisional application claims priority under 35 U.S.C. §119(a) on Patent Application No. 2010-079321 filed in Japan on Mar. 30, 2010, the entire contents of which are hereby incorporated by reference.

TECHNICAL FIELD

The present invention relates to a novel copolymer and a method for producing the novel copolymer, in particular to a novel copolymer having a cyclic structure and a method for producing such a novel copolymer.

BACKGROUND ART

Various copolymers that contain cyclic structures in a main chain have been known. For example, Non-Patent Literature 1 discloses an ethylene-cyclopentene random copolymer which has, as a monomer unit, a structure in which a 1,2-substituted cyclopentane cyclic structure and an alkyl chain are bonded alternately. Further, Patent Literature 1 discloses a copolymer of (i) ethylene and/or α-olefin having 3 to 20 carbon atoms in a carbon chain, and (ii) substituted cyclohexene and/or unsubstituted cyclohexene.

CITATION LIST

[Patent Literature]
[Patent Literature 1]
Japanese Patent Application Publication, Tokukai, No. 2006-193554 (published on Jul. 27, 2006)
[Non-Patent Literature]
[Non-Patent Literature 1]
Macromolecules. Vol. 35. 2002. pp. 9640-9647.

SUMMARY OF INVENTION

Technical Problem

In the above described copolymers, bonding sites in the cyclic structure, which bonding sites are attached to the main chain of the copolymer, are too close to each other. This consequently bends the main chain. Therefore, there is a strong demand for development of a novel copolymer whose main chain structure having a cyclic structure is improved.

In order to solve the above problem, an object of the present invention is to provide a novel copolymer and a method for producing the copolymer.

Solution to Problem

A copolymer of the present invention includes a monomer unit represented by a following formula (1) and a monomer unit derived from olefin (hereinafter called as "olefin unit"):

[Chem. 1]

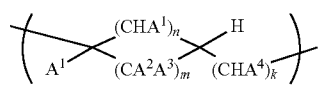

(1)

wherein: each of $A^1$, $A^2$, $A^3$, and $A^4$ independently represents a hydrogen atom, a halogen atom, an alkyl group, an aralkyl group, an aryl group, a silyl group, a siloxy group, an alkoxy group, an aralkyloxy group, an aryloxy group, an amino group, an amide group, an imide group, or a hydrocarbon thio group; which group may have a substituent; and each of m, n, and k is independently an integer in a range of 2 to 20.

A method for producing a copolymer of the present invention which copolymer includes a monomer unit represented by the above formula (1) and an olefin unit, the method includes the step of: copolymerizing a compound represented by the following formula (5) and olefin:

[Chem. 2]

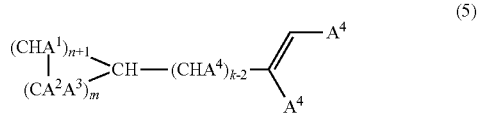

(5)

wherein: each of $A^1$, $A^2$, $A^3$, and $A^4$ independently represents a hydrogen atom, a halogen atom, an alkyl group, an aralkyl group, an aryl group, a silyl group, a siloxy group, an alkoxy group, an aralkyloxy group, an aryloxy group, an amino group, an amide group, an imide group, or a hydrocarbon thio group; each of $A^1$, $A^2$, $A^3$, and $A^4$ is independently any of these groups at different carbons to which the each of $A^1$, $A^2$, $A^3$, and $A^4$ is bonded, and $A^1$, $A^2$, $A^3$, and $A^4$ may be bonded to each other; and each of m, n, and k is independently an integer in a range of 2 to 20.

Advantageous Effects of Invention

The present invention can provide a novel copolymer.

DESCRIPTION OF EMBODIMENTS

<1. Copolymer of Present Invention>

A copolymer of the present invention includes a monomer unit represented by the following formula (1) and an olefin unit. Hereinafter, the monomer unit represented by the formula (1) is referred to as a monomer unit having a cyclic structure.

[Chem. 3]

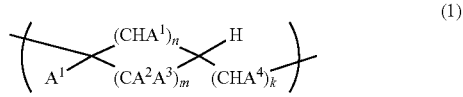

(1)

(Monomer Unit Having Cyclic Structure)

In the above formula (1), each of $A^1$, $A^2$, $A^3$, and $A^4$ should be independently a hydrogen atom, a halogen atom, an alkyl group, an aralkyl group, an aryl group, a silyl group, a siloxy group, an alkoxy group, an aralkyloxy group, an aryloxy group, an amino group, an amide group, an imide group, or a hydrocarbon thio group; which group may have a substituent; and each of m, n, and k should be independently an integer in a range of 2 to 20.

Examples of the halogen atom of $A^1$, $A^2$, $A^3$, and $A^4$ in the above formula (1) encompass a fluorine atom, a chlorine atom, a bromine atom, and an iodine atom. In particular, the halogen atom is preferably a fluorine atom.

Examples of the alkyl group of $A^1$, $A^2$, $A^3$, and $A^4$ in the above formula (1) encompass a straight chain alkyl group, a branched alkyl group, and a cyclic alkyl group. Examples of the straight chain alkyl group encompass a methyl group, an ethyl group, and an n-butyl group. Examples of the branched alkyl group encompass an isopropyl group, an isobutyl group, a tert-butyl group and a neopentyl group. Examples of the cyclic alkyl group encompass a cyclohexyl group and a cyclooctyl group. The alkyl group may have a substituent. Examples of the substituent encompass a halogen atom, a hydrocarbon oxy group, a nitro group, a sulfonate group, and a cyano group.

Examples of the aralkyl group of $A^1$, $A^2$, $A^3$, and $A^4$ in the above formula (1) encompass a benzyl group, a phenethyl group, a 2-methylbenzyl group, a 3-methylbenzyl group, a 4-methylbenzyl group, a 2,6-dimethylbenzyl group, and a 3,5-dimethylbenzyl group. The aralkyl group may have a substituent. Examples of the substituent encompass a halogen atom, a hydrocarbon oxy group, a nitro group, a sulfonate group, a silyl group, and a cyano group.

Examples of the aryl group of $A^1$, $A^2$, $A^3$, and $A^4$ in the above formula (1) encompass a phenyl group, a tolyl group, and a mesityl group. The aryl group may have a substituent. Examples of the substituent encompass a halogen atom, a hydrocarbon oxy group, a nitro group, a sulfonate group, a silyl group, and a cyano group.

The silyl group of $A^1$, $A^2$, $A^3$, and $A^4$ in the above formula (1) may have a substituent. Examples of a substituted silyl group encompass a single substituted silyl group, a disubstituted silyl group, and a trisubstituted silyl group. Examples of the single substituted silyl group encompass a methylsilyl group, an ethylsilyl group, and a phenylsilyl group. Examples of the disubstituted silyl group encompass a dimethylsilyl group, a diethylsilyl group, and a diphenylsilyl group. Examples of the trisubstituted silyl group encompass a trimethylsilyl group, a trimethoxysilyl group, a dimethylmethoxysilyl group, a methyldimethoxysilyl group, a triethylsilyl group, a triethoxysilyl group, a tri-n-propylsilyl group, a triisopropylsilyl group, a tri-n-butylsilyl group, a tri-sec-butylsilyl group, a tert-butyldimethylsilyl group, a triisobutylsilyl group, a tert-butyldiphenylsilyl group, an n-hexyldimethylsilyl group, a tricyclohexylsilyl group, and a triphenylsilyl group. The substituted silyl group may additionally have another substituent. Examples of the substituent encompass a halogen atom, a hydrocarbon oxy group, a nitro group, a sulfonate group, and a cyano group.

The siloxy group of $A^1$, $A^2$, $A^3$, and $A^4$ in the above formula (1) may have a substituent. Examples of a substituted siloxy group encompass siloxy groups such as a trimethylsiloxy group, a trimethoxysiloxy group, a dimethylmethoxysiloxy group, a methyldimethoxysiloxy group, a triethylsiloxy group, a triethoxysiloxy group, a tri-n-propylsiloxy group, a triisopropylsiloxy group, a tri-n-butylsiloxy group, a tri-sec-butylsiloxy group, a tert-butyldimethylsiloxy group, a triisobutylsiloxy group, a tert-butyldiphenylsiloxy group, an n-hexyldimethylsiloxy group, a tricyclohexylsiloxy group, and a triphenylsiloxy group. The substituted siloxy group may additionally have another substituent. Examples of the substituent encompass a halogen atom, a hydrocarbon oxy group, a nitro group, a sulfonate group, and a cyano group.

Examples of the alkoxy group of $A^1$, $A^2$, $A^3$, and $A^4$ in the above formula (1) encompass a straight chain alkoxy group, a branched alkoxy group, and a cyclic alkoxy group. Examples of the straight chain alkoxy group encompass a methoxy group, an ethoxy group, and an n-butoxy group. Examples of the branched alkoxy group encompass an isopropoxy group, an isobutoxy group, a tert-butoxy group, and a neopentoxy group. Examples of the cyclic alkoxy group encompass a cyclohexyloxy group and a cyclooctyloxy group. The alkoxy group may have a substituent. Examples of the substituent encompass a halogen atom, a hydrocarbon oxy group, a nitro group, a sulfonate group, a silyl group, and a cyano group.

Examples of the aralkyloxy group of $A^1$, $A^2$, $A^3$, and $A^4$ in the above formula (1) encompass a benzyloxy group, a phenethyloxy group, a 2-methylbenzyloxy group, a 3-methylbenzyloxy group, a 4-methylbenzyloxy group, a 2,6-dimethylbenzyloxy group, and a 3,5-dimethylbenzyloxy group. The aralkyloxy group may have a substituent. Examples of the substituent encompass a halogen atom, a hydrocarbon oxy group, a nitro group, a sulfonate group, a silyl group, and a cyano group.

Examples of the aryloxy group of $A^1$, $A^2$, $A^3$, and $A^4$ in the above formula (1) encompass a phenoxy group, a 2-methylphenoxy group, a 2-ethylphenoxy group, a 2-n-propylphenoxy group, a 2-isopropylphenoxy group, a 2-n-butylphenoxy group, a 2-isobutylphenoxy group, a 2-tert-butylphenoxy group, a 3-methylphenoxy group, a 3-isopropylphenoxy group, a 3-n-butylphenoxy group, a 3-tert-butylphenoxy group, a 4-methylphenoxy group, a 4-isopropylphenoxy group, a 4-n-butylphenoxy group, a 4-tert-butylphenoxy group, a 2,3-dimethylphenoxy group, a 2,4-dimethylphenoxy group, a 2,5-dimethylphenoxy group, a 2,6-dimethylphenoxy group, a 3,5-dimethylphenoxy group, a 2,6-diisopropylphenoxy group, a 2,6-di-tert-butylphenoxy group, and a naphthoxy group. The aryloxy group may have a substituent. Examples of the substituent encompass a halogen atom, a hydrocarbon oxy group, a nitro group, a sulfonate group, a silyl group, and a cyano group.

The amino group of $A^1$, $A^2$, $A^3$, and $A^4$ in the above formula (1) may have a substituent. Examples of a substituted amino group encompass a straight chain alkylamino group, a branched alkylamino group, and a cyclic alkylamino group. Examples of the straight chain alkylamino group encompass an N-methylamino group, an N-ethylamino group, an N-n-butylamino group, an N,N-dimethylamino group, an N,N-diethylamino group, and an N,N-di-n-butylamino group. Examples of the branched alkylamino group encompass an N,N-diisopropylamino group, an N,N-diisobutylamino group, an N,N-di-tert-butylamino group, and an N,N-dineopentylamino group. Examples of the cyclic alkylamino group encompass an N,N-dicyclohexylamino group, and an N,N-dicyclooctylamino group. The substituted amino group may additionally have another substituent. Examples of the substituent encompass a halogen atom, a hydrocarbon oxy group, a nitro group, a sulfonate group, and a cyano group.

The amide group of $A^1$, $A^2$, $A^3$, and $A^4$ in the above formula (1) may have a substituent. Examples of a substituted amide group encompass amide groups such as an ethanamide group, an N-n-butylethanamide group, an N-methylethanamide group, an N-ethylethanamide group, an N-n-butylhexanamide group, an isopropanamide group, an isobutanamide group, a tert-butanamide group, a neopentanamide group, a cyclohexanamide group, and a cyclooctanamide group. The substituted amide group may additionally have another substituent. Examples of the substituent encompass a halogen atom, a hydrocarbon oxy group, a nitro group, a sulfonate group, and a cyano group.

The imide group of $A^1$, $A^2$, $A^3$, and $A^4$ in the above formula (1) may have a substituent. Examples of a substituted imide group encompass imide groups such as a succinimide group, a maleimide group, and a phthalimide group. The substituted imide group may additionally have another substituent. Examples of the substituent encompass a halogen atom, a hydrocarbon oxy group, a nitro group, a sulfonate group, and a cyano group.

Examples of the hydrocarbon thio group of $A^1$, $A^2$, $A^3$, and $A^4$ in the above formula (1) encompass a straight chain hydrocarbon thio group, a branched hydrocarbon thio group, and a cyclic hydrocarbon thio group. Examples of the straight chain hydrocarbon thio group encompass a methylthio group, an ethylthio group, and an n-butylthio group. Examples of the branched hydrocarbon thio group encompass an isopropylthio group, an isobutylthio group, a tert-butylthio group, and a neopentylthio group. Examples of the cyclic hydrocarbon thio group encompass a cyclohexylthio group, and a cyclooctylthio group. The hydrocarbon thio group may have a substituent. Examples of the substituent encompass a halogen atom, a hydrocarbon oxy group, a nitro group, a sulfonate group, a silyl group, and a cyano group.

In the above formula (1), each of m, n, and k should be independently an integer in a range of 2 to 20. Preferably, each of m and n is independently in a range of 2 to 8, and more preferably, in a range of 2 to 4. Preferably, k is in a range of 2 to 10, and more preferably, in a range of 2 to 8.

The copolymer of the present invention may contain, as a monomer unit having a cyclic structure, one or more kinds of monomer units each represented by the above formula (1). A copolymer containing, as a monomer unit having a cyclic structure, one kind of monomer unit represented by the above formula (1) can be obtained as a copolymer prepared by polymerization of only one kind of alkenylcycloalkane described later and olefin. Further, a copolymer containing, as monomer units each having a cyclic structure, two or more kinds of monomer units each represented by the above formula (1) can be obtained, for example, as a copolymer prepared by polymerization of two or more kinds of alkenylcycloalkanes described later and olefin.

In the copolymer of the present invention, in the monomer unit having a cyclic structure represented by the above formula (1), bonding sites bonded to the main chain is apart from each other by the carbon chain lengths of m carbon atoms and n carbon atoms and are not close to each other. Therefore, it is expected that the problem of bending of the main chain having a cyclic structure can be solved.

In the copolymer of the present invention, the monomer unit represented by the above formula (1) may be a monomer unit represented by the following formula (2):

[Chem. 4]

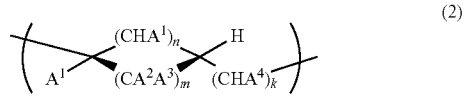

(2)

wherein: each of $A^1$, $A^2$, $A^3$, and $A^4$ should be independently a hydrogen atom, a halogen atom, an alkyl group, an aralkyl group, an aryl group, a silyl group, a siloxy group, an alkoxy group, an aralkyloxy group, an aryloxy group, an amino group, an amide group, an imide group, or a hydrocarbon thio group; each of $A^1$, $A^2$, $A^3$, and $A^4$ is independently any of these groups at different carbons to which the each of $A^1$, $A^2$, $A^3$, and $A^4$ is bonded, and $A^1$, $A^2$, $A^3$, and $A^4$ may be bonded to each other; and each of m, n, and k should be independently an integer in a range of 2 to 20.

Further, in the copolymer of the present invention, the monomer unit represented by the above formula (1) may be a monomer unit represented by the following formula (3):

[Chem. 5]

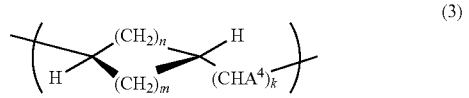

(3)

wherein: $A^4$ should be a hydrogen atom, a halogen atom, an alkyl group, an aralkyl group, an aryl group, a silyl group, a siloxy group, an alkoxy group, an aralkyloxy group, an aryloxy group, an amino group, an amide group, an imide group, or a hydrocarbon thio group; and each of m, n, and k should be independently an integer in a range of 2 to 20.

Further, in the copolymer of the present invention, the monomer unit represented by the above formula (1) may be a monomer unit represented by the following formula (4):

[Chem. 6]

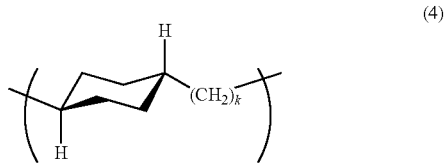

(4)

wherein: k should be an integer in a range of 2 to 20. More preferably, k is an integer in a range of 2 to 10; most preferably, k is an integer in a range of 2 to 8.

As shown in the above formulae (2), (3) and (4), the copolymer of the present invention may include a main chain steric structure with monomer units represented by the above formula (1) in which the portions of the main chain are bonded to the cyclic structure in a trans configuration. The above trans configuration may be 1,4-trans configuration as shown by the above formula (4). Hereinafter, the monomer units of the structure shown by each of the formulae (2), (3), and (4) may be referred to as trans-configuration monomer units, whereas monomer units whose main chain portions are bonded in a cis configuration may be referred to as cis-configuration monomer units which main chain portions are in cyclic structures of the respective monomer units represented by the above formula (1).

The copolymer of the present invention may be formed so as to include monomer units which are all the cis-configuration monomer units or trans-configuration monomer units, or which include the cis-configuration monomer units and trans-configuration monomer units mixedly.

(Olefin Unit)

The olefin unit in the copolymer of the present invention is an olefin-derived monomer unit in the polymerization reaction, i.e., a non-cyclic unsaturated hydrocarbon which has a carbon-carbon double bond or a cyclic unsaturated hydrocarbon which has a carbon-carbon double bond in a ring. The olefin unit may be a unit that keeps a carbon skeleton that the non-cyclic unsaturated hydrocarbon or the cyclic unsaturated hydrocarbon has. Alternatively, the olefin unit may be a unit in which the non-cyclic unsaturated hydrocarbon is cyclized or a unit in which a ring of the cyclic unsaturated hydrocarbon is opened.

(Main Chain Steric Structure and Physical Properties of Copolymer)

In view of resistance to heat, in the main chain steric structure of the copolymer of the present invention, preferably, 70 mol % to 100 mol % of monomer units have a trans-configuration cyclic structure and more preferably, substantially 100 mol % of monomer units have the trans-configuration cyclic structure, in a case where a total amount of monomer units represented by the above formula (1) each having the cyclic structure in the copolymer is 100 mol %. The main chain steric structure of the copolymer of the present invention can be measured by a well-known measurement method. For example, the main chain steric structure may be measured, for example, by using $^{13}$C-NMR.

A $^{13}$C-NMR spectrum of the polymer is attributed to its molecular structure by applying books (for example, R. M. Silverstein "The identification methods of organic compounds from their spectra, 6th edition, the combination of MS, IR and NMR", Tokyo kagaku dojin, p. 214-245) and chemical calculation programs such as Gaussian.

The copolymer of the present invention has a weight average molecular weight (Mw) preferably in a range of 1000 to 100000000, more preferably in a range of 1000 to 10000000, and most preferably in a range of 1000 to 1000000. Accordingly, the copolymer of the present invention is a novel cyclic structure-containing polymer.

A molecular weight distribution of the copolymer of the present invention is preferably in a range of 1.0 to 10.0, more preferably in a range of 1.0 to 8.0, and most preferably in a range of 1.0 to 6.0.

A molar ratio of the monomer unit represented by the formula (1) to olefin unit (the monomer unit represented by the formula (1)/olefin unit) of the copolymer of the present invention is preferably in a range of 99/1 to 1/99, more preferably in a range of 99/1 to 20/80, and still more preferably in a range of 99/1 to 40/60.

<2. Method for Producing Copolymer>

According to a method for producing a copolymer of the present invention, the copolymer of the present invention is produced by copolymerization of a compound represented by the following formula (5) and olefin. Hereinafter, the compound represented by the following formula (5) is referred to as an alkenylcycloalkane.

[Chem. 7]

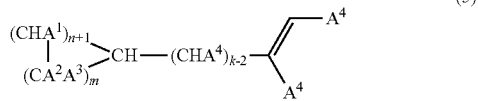

(5)

wherein: each of $A^1$, $A^2$, $A^3$, and $A^4$ independently represents a hydrogen atom, a halogen atom, an alkyl group, an aralkyl group, an aryl group, a silyl group, a siloxy group, an alkoxy group, an aralkyloxy group, an aryloxy group, an amino group, an amide group, an imide group, or a hydrocarbon thio group; each of $A^1$, $A^2$, $A^3$, and $A^4$ is independently any of these groups at different carbons to which the each of $A^1$, $A^2$, $A^3$, and $A^4$ is bonded, and $A^1$, $A^2$, $A^3$, and $A^4$ may be bonded to each other; and each of m, n, and k is independently an integer in a range of 2 to 20.

According to the method for producing the copolymer of the present invention, it is possible to produce a copolymer including the monomer unit represented by the above formula (1) and an olefin unit. Further, it is possible to suitably produce a copolymer in which substantially 100 mol % of monomer units have the trans-configuration cyclic structure in a case where a total amount of monomer units each having a cyclic structure in the copolymer is 100 mol.

[2-1. Monomers]

(Alkenylcycloalkane)

An alkenylcycloalkane as a monomer in the present invention is a compound represented by the above formula (5). In the above formula (5), each of $A^1$, $A^2$, $A^3$, and $A^4$ should independently be a hydrogen atom, a halogen atom, an alkyl group, an aralkyl group, an aryl group, a silyl group, a siloxy group, an alkoxy group, an aralkyloxy group, an aryloxy group, an amino group, an amide group, an imide group, or a hydrocarbon thio group. The alkyl group, the aralkyl group, the aryl group, the silyl group, the siloxy group, the alkoxy group, the aralkyloxy group, the aryloxy group, the amino group, the amide group, the imide group, or the hydrocarbon thio group may have a substituent. Further, each of m, n, and k should be independently an integer in a range of 2 to 20.

A preferable element or a preferable substituent as the hydrogen atom, the halogen atom, the alkyl group, the aralkyl group, the aryl group, the silyl group, the siloxy group, the alkoxy group, the aralkyloxy group, the aryloxy group, the amino group, the amide group, the imide group, or the hydrocarbon thio group of each of $A^1$, $A^2$, $A^3$, and $A^4$ in the above formula (5) is identical to a preferable element or a preferable substituent as the hydrogen atom, the halogen atom, the alkyl group, the aralkyl group, the aryl group, the silyl group, the siloxy group, the alkoxy group, the aralkyloxy group, the aryloxy group, the amino group, the amide group, the imide group, or the hydrocarbon thio group in each of $A^1$, $A^2$, $A^3$, and $A^4$ in the above formula (1).

Further, the substituent that each of the alkyl group, the aralkyl group, the aryl group, the silyl group, the siloxy group, the alkoxy group, the aralkyloxy group, the aryloxy group, the amino group, the amide group, the imide group, or the hydrocarbon thio group in each of $A^1$, $A^2$, $A^3$, and $A^4$ in the above formula (5) may have is identical to the substituent that each of the alkyl group, the aralkyl group, the aryl group, the silyl group, the siloxy group, the alkoxy group, the aralkyloxy group, the aryloxy group, the amino group, the amide group, the imide group, or the hydrocarbon thio group in each of $A^1$, $A^2$, $A^3$, and $A^4$ in the above formula (1) may have.

As the alkenylcycloalkane, a compound represented by the following formula (6) may be used:

[Chem. 8]

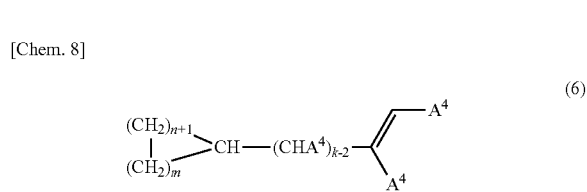

(6)

wherein: $A^4$ should be a hydrogen atom, a halogen atom, an alkyl group, an aralkyl group, an aryl group, a silyl group, a siloxy group, an alkoxy group, an aralkyloxy group, an aryloxy group, an amino group, an amide group, an imide group, or a hydrocarbon thio group; and each of m, n, and k should be independently an integer in a range of 2 to 20.

According to the method for producing the copolymer of the present invention, it is possible to produce a copolymer including a monomer unit represented by the above formula (3) and an olefin unit, by copolymerization of the compound represented by the following formula (6) and olefin.

It is preferable to use, as an alkenylcycloalkane, at least one kind selected from a group including α-alkenylcyclohexane, α-alkenylcycloheptane, α-alkenylcyclooctane, and α-alkenylcyclodecane (Note that the number of carbon atoms of an α-alkenyl group is an integer in a range of 2 to 20.). It is more preferable to use α-alkenylcyclohexane. Examples of the α-alkenylcyclohexane used as the alkenylcycloalkane encompass vinylcyclohexane, allylcyclohexane, 4-cyclohexyl-1-butene, 4-cyclohexyl-1-hexene, 4-cyclohexyl-1-octene, and 4-cyclohexyl-1-decene. Examples of the α-alkenylcycloheptane used as the monomer encompass vinylcycloheptane, allylcycloheptane, 4-cycloheptyl-1-butene, 4-cycloheptyl-1-hexene, 4-cycloheptyl-1-octene, and 4-cycloheptyl-1-decene. Examples of the α-alkenylcyclooctane used as the monomer encompass vinylcyclooctane, allylcyclooctane, 4-cyclooctyl-1-butene, 4-cyclooctyl-1-hexene, 4-cyclooctyl-1-octene, and 4-cyclooctyl-1-decene. Examples of the α-alkenylcyclodecane used as the monomer encompass vinylcyclodecane, allylcyclodecane, 4-cyclodecyl-1-butene, 4-cyclodecyl-1-hexene, 4-cyclodecyl-1-octene, and 4-cyclodecyl-1-decene.

(Olefin)

Olefin as a monomer in the present invention indicates a non-cyclic unsaturated hydrocarbon which has a carbon-carbon double bond, or a cyclic unsaturated hydrocarbon which has a carbon-carbon double bond in a ring. The non-cyclic unsaturated hydrocarbon may be, for examples, straight chain or branched olefin having 2 to 20 carbon atoms, and more preferably 2 to 10 carbon atoms. Examples of the straight chain or branched olefin having 2 to 20 carbon atoms encompass ethylene, propylene, 1-butene, 1-hexene, 1-octene, 1-decene, 1-dodecene, 1-tetradecene, 1-hexadecene, 1-octadecene, 1-eicosene, 4-methyl-1-pentene, 2-hexene, 2-octene, 2-decene, 2-tetradecene, 2-hexadecene, 2-octadecene, 2-eicosene, butadiene, isoprene, 1,5-hexadiene, and 1,7-octadiene.

Further, the cyclic unsaturated hydrocarbon may be, for example, cyclic olefin having 4 to 20 carbon atoms, and more preferably 4 to 10 carbon atoms. Examples of the cyclic olefin having 4 to 20 carbon atoms encompass cyclopentene, cyclohexene, cyclooctane, cyclodecene, 2-norbornene, 1,5-cyclooctadiene, dicyclopentadiene, and 2,5-norbornadiene.

In the method for producing the copolymer of the present invention, a mol ratio of the alkenylcycloalkane and olefin which are supplied for a copolymerization reaction is preferably in a range of 0.001 to 1000, more preferably in a range of 0.005 to 500, and most preferably in a range of 0.01 to 100.

[2-2. Catalyst]

In the method for producing the copolymer of the present invention, a catalyst used for copolymerization of the monomers should be a catalyst prepared by putting a boron compound and a transition metal compound in contact with each other.

(Transition Metal Compound)

The transition metal compound in the present invention should be a transition metal compound represented by the following formula (7):

[Chem. 9]

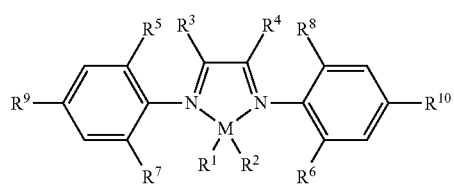

(7)

wherein: M represents an iron atom, a cobalt atom, a nickel atom, a palladium atom, or a copper atom; each of $R^1$ and $R^2$ independently represents a hydrogen atom, a halogen atom, an alkyl group, an aralkyl group, an aryl group, an alkoxy group, an aralkyloxy group, or an aryloxy group; each of $R^3$ to $R^{10}$ independently represents a hydrogen atom, a halogen atom, an alkyl group, an aralkyl group, an aryl group, an alkoxy group, an aralkyloxy group, an aryloxy group, an acyl group, an alkoxycarbonyl group, an aralkyloxycarbonyl group, an aryloxycarbonyl group, an amino group, an amide group, or a hydrocarbon thio group; and $R^3$ and $R^4$ may be bonded to each other.

In the above formula (7), M should be an iron atom, a cobalt atom, a nickel atom, a palladium atom, or a copper atom. Among these, the palladium atom is particularly preferable as the metal atom.

In the above formula (7), each of $R^1$ and $R^2$ should independently be a hydrogen atom, a halogen atom, an alkyl group, an aralkyl group, an aryl group, an alkoxy group, an aralkyloxy group, or an aryloxy group, and $R^1$ and $R^2$ may be bonded to each other so as to form a ring. Each of the alkyl group, the aralkyl group, the aryl group, the alkoxy group, the aralkyloxy group, or the aryloxy group may have a substituent.

Examples of the halogen atom in each of $R^1$ and $R^2$ in the above formula (7) encompass a fluorine atom, a chlorine atom, a bromine atom, and an iodine atom. Among these, the chlorine atom or the bromine atom is particularly preferable as the halogen atom.

Examples of the alkyl group in each of $R^1$ and $R^2$ of the above formula (7) encompass a straight chain alkyl group, a branched alkyl group, and a cyclic alkyl group. Examples of the straight chain alkyl group encompass a methyl group, an ethyl group, and an n-butyl group. Examples of the branched alkyl group encompass an isopropyl group, an isobutyl group, a tert-butyl group, and a neopentyl group. Examples of the cyclic alkyl group encompass a cyclohexyl group and a cyclooctyl group. The alkyl group may have a substituent. Examples of the substituent encompass a halogen atom, a hydrocarbon oxy group, a nitro group, a sulfonate group, and a cyano group. In particular, the alkyl group is preferably an alkyl group having 1 to 20 carbon atoms, more preferably a straight chain unsubstituted alkyl group having 1 to 12 carbon atoms, and still more preferably a methyl group.

Examples of the aralkyl group in each of $R^1$ and $R^2$ of the above formula (7) encompass a benzyl group and a phenethyl group. This aralkyl group may have a substituent. Examples of the substituent encompass a halogen atom, a hydrocarbon oxy group, a nitro group, a sulfonate group, a silyl group, and a cyano group. In particular, the aralkyl group is preferably an aralkyl group having 7 to 12 carbon atoms, more preferably an unsubstituted aralkyl group having 7 to 12 carbon atoms, and still more preferably a benzyl group.

Examples of the aryl group in each of $R^1$ and $R^2$ of the above formula (7) encompass a phenyl group, a naphthyl group, a 4-tolyl group, a mesityl group, and a 4-phenylphenyl group. This aryl group may have a substituent. Examples of the substituent encompass a halogen atom, a hydrocarbon oxy group, a nitro group, a sulfonate group, a silyl group, and a cyano group. In particular, the aryl group is preferably an aryl group having 6 to 20 carbon atoms, more preferably an aryl group having 6 to 12 carbon atoms, and the still more preferably a phenyl group, a 4-tolyl group, or a mesityl group.

Examples of the alkoxy group in each of $R^1$ and $R^2$ of the above formula (7) encompass a methoxy group, an ethoxy group, an n-propoxy group, an isopropoxy group, an n-butoxy group, a sec-butoxy group, a tert-butoxy group, an n-pentyloxy group, a neopentyloxy group, an n-hexyloxy group, an n-octyloxy group, an n-dodecyloxy group, an n-pentadecyloxy group, and an n-eicosyloxy group.

Examples of the aralkyloxy group in each of $R^1$ and $R^2$ of the above formula (7) encompass a benzyloxy group, a (2-methylphenyl)methoxy group, a (3-methylphenyl)methoxy group, a (4-methylphenyl)methoxy group, a (2,3-dimethylphenyl)methoxy group, a (2,4-dimethylphenyl)methoxy group, a (2,5-dimethylphenyl)methoxy group, a (2,6-dimethylphenyl)methoxy group, a (3,4-dimethylphenyl)methoxy group, a (3,5-dimethylphenyl)methoxy group, a (2,3,4-trimethylphenyl)methoxy group, a (2,3,5-trimethylphenyl)methoxy group, a (2,3,6-trimethylphenyl)methoxy group, a (2,4,5-trimethylphenyl)methoxy group, a (2,4,6-trimethylphenyl) methoxy group, a (3,4,5-trimethylphenyl)methoxy group, a (2,3,4,5-tetramethylphenyl)methoxy group, a (2,3,4,6-tetramethylphenyl)methoxy group, a (2,3,5,6-tetramethylphenyl)methoxy group, a (pentamethylphenyl)methoxy group, an (ethylphenyl)methoxy group, an (n-propylphenyl)methoxy group, an (isopropylphenyl)methoxy group, an (n-butylphenyl)methoxy group, a (sec-butylphenyl)methoxy group, a (tert-butylphenyl)methoxy group, an (n-hexylphenyl)methoxy group, an (n-octylphenyl)methoxy group, an (n-decylphenyl)methoxy group, a naphthylmethoxy group, and an anthracenylmethoxy group. The aralkyloxy group may have a substituent. Examples of the substituent encompass a halogen atom, a hydrocarbon oxy group, a nitro group, a sulfonate group, a silyl group, and a cyano group. In particular, the aralkyloxy group is preferably an aralkyloxy group having 7 to 20 carbon atoms, and more preferably a benzyloxy group.

Examples of the aryloxy group in each of $R^1$ and $R^2$ of the above formula (7) encompass a phenoxy group, a 2-methylphenoxy group, a 3-methylphenoxy group, a 4-methylhenoxy group, a 2,3-dimethylphenoxy group, a 2,4-dimethylphenoxy group, a 2,5-dimethylphenoxy group, a 2,6-dimethylphenoxy group, a 3,4-dimethylphenoxy group, a 3,5-dimethylphenoxy group, a 2-tert-butyl-3-methylphenoxy group, a 2-tert-butyl-4-methylphenoxy group, a 2-tert-butyl-5-methylphenoxy group, a 2-tert-butyl-6-methylphenoxy group, a 2,3,4-trimethylphenoxy group, a 2,3,5-trimethylphenoxy group, a 2,3,6-trimethylphenoxy group, a 2,4,5-trimethylphenoxy group, a 2,4,6-trimethylphenoxy group, a 2-tert-butyl-3,4-dimethylphenoxy group, a 2-tert-butyl-3,5-dimethylphenoxy group, a 2-tert-butyl-3,6-dimethylphenoxy group, a 2,6-di-tert-butyl-3-methylphenoxy group, a 2-tert-butyl-4,5-dimethylphenoxy group, a 2,6-di-tert-butyl-4-methylphenoxy group, a 3,4,5-trimethylphenoxy group, a 2,3,4,5-tetramethylphenoxy group, a 2-tert-butyl-3,4,5-trimethylphenoxy group, a 2,3,4,6-tetramethylphenoxy group, a 2-tert-butyl-3,4,6-trimethylphenoxy group, a 2,6-di-tert-butyl-3,4-dimethylphenoxy group, a 2,3,5,6-tetramethylphenoxy group, a 2-tert-butyl-3,5,6-trimethylphenoxy group, a 2,6-di-tert-butyl-3,5-dimethylphenoxy group, a pentamethylphenoxy group, an ethylphenoxy group, an n-propylphenoxy group, an isopropylphenoxy group, an n-butylphenoxy group, a sec-butylphenoxy group, a tert-butylphenoxy group, an n-hexylphenoxy group, an n-octylphenoxy group, an n-decylphenoxy group, a naphthoxy group, and an anthracenoxy group. The aryloxy group may have a substituent. Examples of the substituent encompass a halogen atom, a hydrocarbon oxy group, a nitro group, a sulfonate group, a silyl group, and a cyano group. In particular, the aryloxy group is preferably an aryloxy group having 6 to 20 carbon atoms.

In the above formula (7), each of $R^1$ and $R^2$ is preferably a hydrogen atom, a halogen atom, an alkyl group, or an aryl group. Each of $R^1$ and $R^2$ is more preferably a hydrogen atom, a halogen atom, or a straight chain unsubstituted alkyl group having 1 to 12 carbon atoms, and particularly preferably a chlorine atom or a methyl group.

In the above formula (7), each of $R^3$ to $R^{10}$ should independently be a hydrogen atom, a halogen atom, an alkyl group, an aralkyl group, an aryl group, an alkoxy group, an aralkyloxy group, an aryloxy group, an acyl group, an alkoxycarbonyl group, an aralkyloxycarbonyl group, an aryloxycarbonyl group, an amino group, an amide group, or a hydrocarbon thio group. Further, the alkyl group, the aralkyl group, the aryl group, the alkoxy group, the aralkyloxy group, the aryloxy group, then acyl group, the alkoxycarbonyl group, the aralkyloxycarbonyl group, the aryloxycarbonyl group, the amino group, the amide group, or the hydrocarbon thio group may have a substituent.

Examples of the halogen atom, the alkyl group, the aralkyl group, the aryl group, the alkoxy group, the aralkyloxy group, and the aryloxy group in each of $R^3$ to $R^{10}$ in the above formula (7) are identical to the examples of the halogen atom, the alkyl group, the aralkyl group, the aryl group, the alkoxy group, the aralkyloxy group, and the aryloxy group in each of $R^1$ and $R^2$ described above.

Examples of the acyl group in each of $R^3$ to $R^{10}$ of the above formula (7) encompass a formyl group, an acetyl group, a propionyl group, a butyryl group, an isobutyryl group, an isovaleryl group, a pivaloyl group, a heptanoyl group, and a decanoyl group. The acyl group may have a substituent. Examples of the substituent encompass a halogen atom, a hydrocarbon oxy group, a nitro group, a sulfonate group, a silyl group, and a cyano group.

Examples of the alkoxycarbonyl group in each of $R^3$ to $R^{10}$ of the above formula (7) encompass a methoxycarbonyl group, an ethoxycarbonyl group, a butoxycarbonyl group, an octyloxycarbonyl group, and a decyloxycarbonyl group. The alkoxycarbonyl group may have a substituent. Examples of the substituent encompass a halogen atom, a hydrocarbon oxy group, a nitro group, a sulfonate group, a silyl group, and a cyano group.

Examples of the aralkyloxycarbonyl group in each of $R^3$ to $R^{10}$ of the above formula (7) encompass a 2-phenylethyloxycarbonyl group, a benzyloxycarbonyl group, a 1-phenylethyloxycarbonyl group, a 3-phenylpropyloxycarbonyl group, and a 4-phenylbutyloxycarbonyl group. The aralkyloxycarbonyl group may have a substituent. Examples of the substituent encompass a halogen atom, a hydrocarbon oxy group, a nitro group, a sulfonate group, a silyl group, and a cyano group.

Examples of the aryloxycarbonyl group in each of $R^3$ to $R^{10}$ of the above formula (7) encompass a phenyloxycarbonyl group, a 2-methylphenyloxycarbonyl group, a 4-methylphenyloxycarbonyl group, a 4-methoxyphenyloxycarbonyl group, a 1-naphthyloxycarbonyl group, a 2-methyl-1-naphthyloxycarbonyl group, a 3-methyl-1-naphthyloxycarbonyl group, a 4-methyl-1-naphthyloxycarbonyl group, a 6-methyl-1-naphthyloxycarbonyl group, a 2-naphthyloxycarbonyl group, a 1-methyl-2-naphthyloxycarbonyl group, a 3-methyl-2-naphthyloxycarbonyl group, a 4-methyl-2-naphthyloxycarbonyl group, and a 6-methyl-2-naphthyloxycarbonyl group. The aryloxy carbonyl group may have a substituent. Examples of the substituent encompass a halogen atom, a hydrocarbon oxy group, a nitro group, a sulfonate group, a silyl group, and a cyano group.

Examples of the amino group in each of $R^3$ to $R^{10}$ of the above formula (7) may have a substituent. Examples of a substituted amino group encompass a straight chain alkylamino group, a branched alkylamino group, and a cyclic alkylamino group. Examples of the straight chain alkylamino group encompass an N-methylamino group, an N-ethylamino group, an N,N-n-butylamino group, an N,N-dimethylamino group, an N,N-diethylamino group, and an N,N-di-n-butylamino group. Examples of the branched alkylamino group encompass an N,N-diisopropylamino group, an N,N-diisobutylamino group, an N,N-di-tert-butylamino group, and an N,N-dineopentylamino group. Examples of the cyclic alkylamino group encompass an N,N-dicyclohexylamino group and an N,N-dicyclooctylamino group. The substituted amino group may additionally have another substituent. Examples of the substituent encompass a halogen atom, a hydrocarbon oxy group, a nitro group, a sulfonate group, and a cyano group.

Examples of the amide group in each of $R^3$ to $R^{10}$ of the above formula (7) may have a substituent. Examples of a substituted amide group encompass an ethanamide group, an N-n-butylethanamide group, an N-methylethanamide group, an N-ethylethanamide group, an N-n-butylhexanamide group, an isopropanamide group, an isobutanamide group, a tert-butanamide group, a neopentanamide group, a cyclohexanamide group, and a cyclooctanamide group. The substituted amide group may additionally have another substituent. Examples of the substituent encompass a halogen atom, a hydrocarbon oxy group, a nitro group, a sulfonate group, and a cyano group.

Examples of the hydrocarbon thio group in each of $R^3$ to $R^{10}$ of the above formula (7) encompass an alkylthio group, an arylthio group, and an aralkylthio group. Examples of the alkylthio group encompass a methylthio group, an ethylthio group, an isopropylthio group, and a tert-butylthio group. Examples of the arylthio group encompass a phenylthio group and a naphthylthio group. Examples of the aralkylthio group encompass a benzylthio group, and a 9-fluorenylmethylthio group. The hydrocarbon thio group may have a substituent. Examples of the substituent encompass a halogen atom, a hydrocarbon oxy group, a nitro group, a sulfonate group, and a cyano group.

Each of $R^3$ and $R^4$ of the above formula (7) may independently be a hydrocarbon group having 1 to 20 carbon atoms. This hydrocarbon group may be an alkyl group or an aryl group. Further, the hydrocarbon group may have a substituent. Examples of the substituent encompass a halogen atom, a hydrocarbon oxy group, a nitro group, a sulfonyl group, and a silyl group. Examples of the alkyl group encompass a straight chain alkyl group, a branched alkyl group, and a cyclic alkyl group. Examples of the straight chain alkyl group encompass a methyl group, an ethyl group, and an n-butyl group. Examples of the branched alkyl group encompass an isopropyl group, an isobutyl group, a tert-butyl group, and a neopentyl group. Examples of the cyclic alkyl group encompass a cyclohexyl group and a cyclooctyl group. Among them, the alkyl group is preferably an alkyl group having 1 to 20 carbon atoms, more preferably a straight chain alkyl group having 1 to 12 carbon atoms, and still more preferably a methyl group or an ethyl group. Examples of the aryl group encompass a phenyl group, a naphthyl group, a 4-tolyl group, and a mesityl group. Among these, the aryl group is preferably an aryl group having 6 to 20 carbon atoms, more preferably an aryl group having 6 to 12 carbon atoms, and still more preferably a phenyl group or a mesityl group.

$R^3$ and $R^4$ in the above formula (7) may be bonded to each other so as to form a ring with the carbon atoms bonded to $R^3$ and $R^4$, respectively. Examples of the ring thus formed encompass an aliphatic ring and an aromatic ring. Each of these rings may have a substituent. Examples of a divalent group formed by the bonding of $R^3$ and $R^4$ in the aliphatic ring encompass a 1,2-ethylene group, an ethene-1,2-diyl group, a cyclohexane-1,2-diyl group, a norbornane-1,2-diyl group, a butane-2,3-diyl group, a 2,3-dimethylbutane-2,3-diyl group, and a pentane-2,4-diyl group. Examples of a divalent group formed by the bonding of $R^3$ and $R^4$ in the aromatic ring encompass a 1,2-phenylene group, and a naphthalene-1,8-diyl group. The divalent group formed by the bonding of $R^3$ and $R^4$ in the aromatic ring is preferably a naphthalene-1,8-diyl group.

Each of $R^5$ and $R^8$ in the above formula (7) is preferably an alkyl group, more preferably an alkyl group having 1 to 12 carbon atoms, and still more preferably a methyl group, an ethyl group, an n-propyl group, an isopropyl group, an n-butyl group, an isobutyl group, or a tert-butyl group.

Each of $R^6$ and $R^7$ in the above formula (7) may independently be an aryl group having 7 to 20 carbon atoms. Examples of the aryl group encompass a 2-methylphenyl group, a 3-methylphenyl group, a 4-methylphenyl group, a 2,3-dimethylphenyl group, a 2,4-dimethylphenyl group, a 2,5-dimethylphenyl group, a 2,6-dimethylphenyl group, a 3,4-dimethylphenyl group, a 3,5-dimethylphenyl group, a naphthyl group, a 2-methyl-1-naphthyl group, a 3-methyl-1-naphthyl group, a 4-methyl-1-naphthyl group, a 2,3-dimethyl-1-naphthyl group, a 2,4-dimethyl-1-naphthyl group, a 2,5-dimethyl-1-naphthyl group, a 2,6-dimethyl-1-naphthyl group, a 3,4-dimethyl-1-naphthyl group, a 3,5-dimethyl-1-naphthyl group, a 3,6-dimethyl-1-naphthyl group, an anthracenyl group, a 2-methyl-1-anthracenyl group, a 3-methyl-10-anthracenyl group, a 4-methyl-10-anthracenyl group, a 2,3-dimethyl-10-anthracenyl group, a 2,4-dimethyl-10-anthracenyl group, a 2,5-dimethyl-1-10-anthracenyl group, a 2,6-dimethyl-10-anthracenyl group, a 3,4-dimethyl-10-anthracenyl group, a 3,5-dimethyl-10-anthracenyl group, a 3,6-dimethyl-10-anthracenyl group, and a 2-methyl-10-anthracenyl group. Among these, the aryl group is preferably a substituted phenyl group, a naphthyl group, or an anthracenyl group, and more preferably a 2-methyl-phenyl group or a naphthyl group.

In the above formula (7), each of $R^9$ and $R^{10}$ is preferably a hydrogen atom or an alkyl group, more preferably a hydrogen atom or an alkyl group having 1 to 12 carbon atoms, and still more preferably a methyl group, an ethyl group, an n-propyl group, an isopropyl group, an n-butyl group, or an isobutyl group.

Further, the transition metal compound may be a transition metal compound represented by the following formula (8):

[Chem. 10]

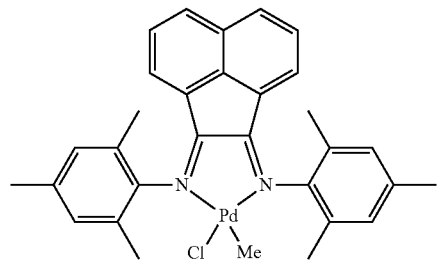

(8)

Alternatively, the transition metal compound may be a transition metal compound represented by the following formula (9):

[Chem. 11]

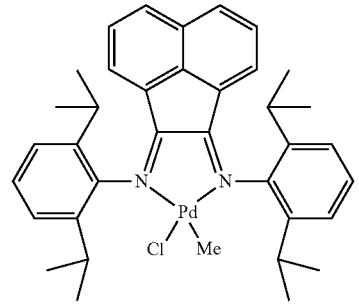

(9)

(Boron Compound)

A boron compound in the present invention may be a well-known compound. Examples of the boron compound encompass the following compounds and a combination of one or more kinds of the following compounds.

(X1) Boron compound represented by the formula: $BQ^1Q^2Q^3$;

(X2) Boron compound represented by the formula: $G^+(BQ^1Q^2Q^3Q^4)^-$; and (X3) Boron compound represented by the formula: $(J-H)^+(BQ^1Q^2Q^3Q^4)^-$ Note that: in the above formulae (X1) to (X3), B represents a boron atom that has a trivalent valence state; each of $Q^1$ to $Q^4$ independently represents a halogen atom, a hydrocarbon group, a halogenated hydrocarbon group, a silyl group, a siloxy group, an alkoxy group, an amino group, an amide group, or an imide group; $G^+$ represents an inorganic or organic cation; J represents a neutral Lewis base; and $(J-H)^+$ represents a Broensted acid.

Each of $Q^1$ to $Q^4$ in the above formulae (X1) to (X3) is preferably a halogen atom, a hydrocarbon group having 1 to 20 carbon atoms, a halogenated hydrocarbon group having 1 to 20 carbon atoms, a silyl group having 1 to 20 carbon atoms, a siloxy group, an amino group substituted by a hydrocarbon group having 2 to 20 carbon atoms, an amide group substituted by a hydrocarbon group having 2 to 20 carbon atoms, or an imide group substituted by a hydrocarbon group having 2 to 20 carbon atoms. Each of $Q^1$ to $Q^4$ is more preferably a halogen atom, a hydrocarbon group having 1 to 20 carbon atoms, or a halogenated hydrocarbon group having 1 to 20 carbon atoms. Each of $Q^1$ to $Q^4$ is still more preferably a fluorinated hydrocarbon group containing at least one fluorine atom which fluorinated hydrocarbon group has 1 to 20 carbon atoms. It is particularly preferable that each of $Q^1$ to $Q^4$ be a fluorinated aryl group containing at least one fluorine atom which fluorinated aryl group has 6 to 20 carbon atoms.

Examples of the boron compound represented by the above formula (X1) encompass tris(pentafluorophenyl)borane, tris(2,3,5,6-tetrafluorophenyl)borane, tris(2,3,4,5-tetrafluorophenyl)borane, tris(3,4,5-trifluorophenyl)borane, tris(2,3,4-trifluorophenyl)borane, and phenylbis(pentafluorophenyl)borane.

Examples of $G^+$ that is an inorganic cation in the boron compound represented by the above formula (X2) encompass a ferrocenium cation, an alkyl-substituted ferrocenium cation, and a silver cation. Examples of $G^+$ that is an organic cation is a triphenylmethyl cation.

Examples of $(BQ^1Q^2Q^3Q^4)^-$ in the above formula (X2) encompass tetrakis(pentafluorophenyl)borate, tetrakis(2,3,5,6-tetrafluorophenyl)borate, tetrakis(2,3,4,5-tetrafluorophenyl)borate, tetrakis(3,4,5-trifluorophenyl)borate, tetrakis(2,3,4-trifluorophenyl)borate, phenyltris(pentafluorophenyl)borate, and tetrakis[3,5-bis(trifluoromethyl)phenyl]borate.

Examples of the boron compound represented by the above formula (X2) encompass lithiumtetrakis[3,5-bis(trifluoromethyl)phenyl]borate, sodiumtetrakis[3,5-bis(trifluoromethyl)phenyl]borate, potassiumtetrakis[3,5-bis(trifluoromethyl)phenyl]borate, silvertetrakis(pentafluorophenyl)borate, ferroceniumtetrakis(pentafluorophenyl)borate, 1,1'-dimethylferroceniumtetrakis(pentafluorophenyl)borate, tetrabutylphosphoniumtetrakis(pentafluorophenyl)borate, tetraphenylphosphoniumtetrakis(pentafluorophenyl)borate, tetramethylammoniumtetrakis(pentafluorophenyl)borate, trimethylsulfoniumtetrakis(pentafluorophenyl)borate, diphenyliodoniumtetrakis(pentafluorophenyl)borate, triphenylcarbeniumtetrakis(pentafluorophenyl)borate, and triphenylcarbeniumtetrakis[3,5-bis(trifluoromethyl)phenyl]borate. Among them, the most preferable boron compound represented by the above formula (X2) is sodiumtetrakis[3,5-bis(trifluoromethyl)phenyl]borate.

Examples of $(J-H)^+$ in the above formula (X3) encompass trialkyl-substituted ammonium, N,N-dialkylanilinium, dialkylammonium and triarylphosphonium. The same substances as the examples of $(J-H)^+$ can be provided as examples of $(BQ^1Q^2Q^3Q^4)^-$.

Examples of the boron compound represented by the above formula (X3) encompass triethylammoniumtetrakis(pentafluorophenyl)borate, tripropylammoniumtetrakis(pentafluorophenyl)borate, tri(n-butyl)ammoniumtetrakis(pentafluorophenyl)borate, tri(n-butyl)ammoniumtetrakis[3,5-bis(trifluoromethyl)phenyl]borate, N,N-dimethylaniliniumtetrakis(pentafluorophenyl)borate, N,N-diethylaniliniumtetrakis(pentafluorophenyl)borate, N,N-dimethyl-2,4,6-trimethylaniliniumtetrakis(pentafluorophenyl)borate, N,N-dimethylaniliniumtetrakis[3,5-bis(trifluoromethyl)phenyl]borate, diisopropylammoniumtetrakis(pentafluorophenyl)borate, dicyclohexylammoniumtetrakis(pentafluorophenyl)borate, triphenylphosphoniumtetrakis(pentafluorophenyl)borate, tri(methylphenyl)phosphoniumtetrakis(pentafluorophenyl)borate, and tri(dimethylphenyl)phosphoniumtetrakis(pentafluorophenyl)borate.

The boron compound in the present invention is preferably the boron compound represented by the above formula (X3). In particular, sodiumtetrakis[3,5-bis(trifluoromethyl)phenyl]borate is preferable as the boron compound.

(Method for Producing Catalyst)

A method for producing the catalyst in the present invention can be a method according to which at least one kind of boron compound and the above described transition metal compound are brought in contact with each other. The method to cause the contact may be, for example, by simple mixing or stirring as appropriate.

Each of the transition metal compound and the boron compound in the present invention can be used in the form of solutions. Examples of solvents of the solutions encompass methylene chloride, chloroform, toluene, pentane, hexane, and heptane. In particular, methylene chloride, chloroform, or toluene is preferable as the solvents.

A concentration of a transition metal compound solution is in general in a range of 0.01 μmol/L to 500 μmol/L, preferably in a range of 0.05 μmol/L to 100 μmol/L, and still more preferably 0.05 μmol/L to 50 μmol/L. A concentration of a boron compound solution is in general in a range of 0.01 μmol/L to 500 μmol/L, preferably in a range of 0.05 μmol/L to 200 μmol/L, and still more preferably 0.05 μmol/L to 100 μmol/L. By arranging the concentration of the transition metal compound solution to be 0.01 μmol/L or more and the concentration of the boron compound solution to be 0.01 μmol/L or more, an amount of solvent to be used can be reduced. This is advantageous in view of cost. Further, by arranging the concentration of the transition metal compound solution to be 500 μmol/L or less and the concentration of the boron compound solution to be 500 mol/L or less, these compounds can be sufficiently dissolved. This makes it possible to prevent precipitation of the compounds.

Note that the catalyst of the present invention may be combined with a support made of a particulate substance of an inorganic compound or an organic compound. Examples of the inorganic compound encompass silica gel and alumina. Further, an example of the organic compound is a styrene polymer.

[2-3. Polymerization Method]

Examples of a polymerization method in the present invention encompass a batch type or continuous type gas phase polymerization method, bulk polymerization method, and solution polymerization or slurry polymerization method with the use of a suitable polymerization solvent. The polymerization solvent may be any solvent as long as the solvent does not deactivate a polymerization catalyst. Examples of the polymerization solvent encompass hydrocarbon solvents such as benzene, toluene, pentane, hexane, heptane, and cyclohexane, and halogenated solvents such as methylene chloride and chloroform.

A polymerization temperature in the present invention is preferably in a range of −100° C. to 250° C., and more preferably in a range of −50° C. to 200° C. In a case where the polymerization temperature is −100° C. or higher, the solvent shows sufficient activity for a polymerization reaction. In a case where the polymerization temperature is 250° C. or less, it is possible to obtain a polymer that has a higher molecular weight and/or to prevent the occurrence of a side reaction such as an isomerization reaction.

For adjusting a molecular weight of a polymer to be obtained, a chain transfer agent may be used. One example of the chain transfer agent is hydrogen.

A polymerization time in the present invention is preferably in a range of 1 minute to 72 hours. In a case where the polymerization time is 1 minute or more, a sufficient yield of the polymer can be obtained. Further, it is advantageous to set the polymerization time to 72 hours or less because the polymerization time set to 72 hours or less makes it possible to suppress production cost of the polymerization.

The following shows Examples and explains the embodiment of the present invention more in detail.

EXAMPLES

The following explains conditions in measurement in Examples, regarding the items below.
(Steric Positional Relationship)
Regarding a steric positional relationship between a main chain and a ring in the copolymer, how much proportion the polymers each having a trans configuration account for in the copolymer was found out by use of $^{13}$C-NMR under the following conditions:

Examples 1 to 6

Measured spectrum: $^{13}$C-NMR spectrum
Machine Type: LA-500 manufactured by JEOL Ltd.
Solvent for Measurement: 1,2-dichlorobenzene-$d_4$
Temperature for Measurement: 135° C.
Sample Concentration: 50 mg/0.5 ml
Reference material: 1,2-dichlorobenzene 127.68 ppm
Identification of $^{13}$C-NMR signals for 1,2-dichlorobenzene is as follows:

[Chem. 12]

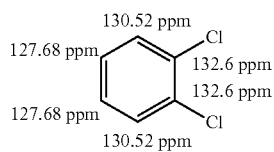

Examples 7 to 16

Measured spectrum: $^{13}$C-NMR spectrum
Machine Type: JNM-AL400 manufactured by JEOL Ltd.
Solvent for Measurement: 1,2-dichlorobenzene-$d_4$
Temperature for Measurement: 135° C.
Sample Concentration: 100 mg/0.4 mL
Reference material: 132.6 ppm (Cl-bonded carbon of 1,2-dichlorobenzene)
Pulse delay: 1.8 seconds
ACQTM: 1.2 seconds
Pulse: 5.8 micro seconds
The number of carbons attached to a specific carbon: DEPT 135°

In a $^{13}$C-NMR spectrum of the polymers:
a signal around 38.5 ppm is attributed to tertiary carbons a in the following formula (A);
a signal around 33.6 ppm is attributed to secondary carbons b in the following formula (A);
a signal around 34.8 ppm is attributed to secondary carbons c in the following formula (A);
a signal around 38.1 ppm is attributed to tertiary carbons d in the following formula (B);
a signal around 33.6 ppm is attributed to secondary carbons e in the following formula (B);
a signal around 38.0 ppm is attributed to secondary carbons f in the following formula (B); and
a signal around 24.3 ppm is attributed to secondary carbon g in the following formula (B).

[Chem. 12]

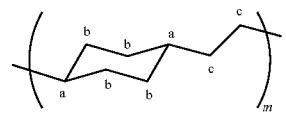

(A)

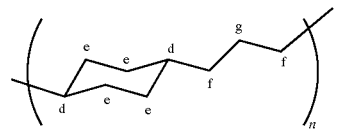

(B)

The above identifications are carried out by spectrum analysis using $^{13}$C-NMR spectral data of trans-1,4-dimethyl-cyclohexane, cis-1,4-dimethylcyclohexane, trans-1,2-dimethylcyclohexane, cis-1,2-dimethylcyclohexane, and methylcyclohexane obtained from Spectra database system for organic compounds of the National Institute of Advanced Industrial Science and Technology.

[Melting Point, Crystallization Temperature, and Glass Transition Point]

Examples 1 to 6

A melting point and a glass transition point of a substance were measured under the following conditions by Differential Scanning calorimetry (DSC) by use of a type of an apparatus called DSC-6200R manufactured by Seiko Instruments Inc.
Temperature Increase: 25° C. to 300° C. at a rate of 10° C./min, and then keep at 300° C. for 5 minutes
Cooling: 300° C. to −60° C. at a rate of −20° C./min, and then keep at −60° C. for 5 minutes
Measurement: −60° C. to 300° C. at a rate of 10° C./min Examples 7 to 16

A melting point, a crystallization temperature, and a glass transition point of a substance were measured under the following conditions by Differential Scanning calorimetry (DSC) by use of a type of an apparatus called SSC-5200 manufactured by Seiko Instruments Inc. A crystallization temperature was obtained from a DSC cooling curve, and a glass transition point and a melting point were obtained from a DSC second temperature increase curve.

Temperature Increase (first): 20° C. to 300° C. at a rate of 10° C./min, and then keep at 300° C. for 10 minutes
Cooling: 300° C. to −50° C. at a rate of −10° C./min, and then keep at −50° C. for 10 minutes
Temperature Increase (second): −50° C. to 300° C. at a rate of 10° C./min

[Thermal Decomposition Point]

A 5% decomposition point ($T_d^5$) of a substance was measured under the following conditions by Thermogravimetric/Differential Thermal Analyzer (TG/DTA) by use of a type of an apparatus called TG/DTA6200 manufactured by Seiko Instruments Inc.

Temperature Increase: room temperature to 500° C. at a rate of 10° C./min
Atmosphere: Under nitrogen (Number Average Molecular Chain Length and Molecular Weight Distribution)

Gel Permeation Chromatography (GPC) was carried out under the following conditions. A calibration curve was produced by use of standard polystyrene. A molecular weight distribution was evaluated by a ratio (Aw/An) of a weight average molecular chain length (Aw) and a number average molecular chain length (An). The weight average molecular chain length (Aw) is defined as a value obtained by multiplying, by 2.52 Angstrom (the distance of alternate carbons on carbon repeating chain), a result of dividing a weight average molecular weight in polystyrene standard by 104 that is a monomer unit weight of polystyrene. The number average molecular chain length (An) is defined as a value obtained by multiplying, by 2.52 Angstrom (the distance of alternate carbons on carbon repeating chain), a result of dividing a number average molecular weight in polystyrene standard by 104 that is a monomer unit weight of polystyrene.

Machine Type Millipore Waters 150 C
Column: TSK-GEL GMH-HT 7.5×600×2
Temperature for Measurement: 152° C.
Carrier: o-dichlorobenzene
Concentration for Measurement: 5 mg/5 ml
Molecular Weight Standard: polystyrene

[Inherent Viscosity]

Inherent viscosity is measured with Ubbelohde viscosimeter at 135° C., by using tetralin as a solvent.

Example 1

Methylene chloride (1.5 mL) was added to a 25 mL Schlenk flask containing chloro(methyl)[N,N'-(1,2-dihydroacenaphthylene-1,2-diylidene)bis(2,6-diisopropylaniline-κN)]palladium (6.6 mg, 0.01 mmol) and sodiumtetrakis{3,5-bis(trifluoromethyl)phenyl}borate (10.6 mg, 0.012 mmol), with 5-minute stirring after the addition. Then, into this Schlenk flask, vinylcyclohexane (0.17 g, 1.5 mmol) and 1-hexene (0.12 g, 1.5 mmol) were added, with 1-hour stirring at the room temperature after the addition. After polymerization, precipitated polymers were isolated and collected.

As a result, 0.16 g of the polymers were obtained. The polymers obtained had a number average molecular chain length (An) of 739 and a molecular weight distribution (Aw/An) of 2.1.

Example 2

Polymerization was carried out in the same manner as in Example 1 except that the monomer was changed from vinylcyclohexane (0.17 g, 1.5 mmol) to allylcyclohexane (0.19 g, 1.5 mmol) and the stirring for the polymerization was carried out for 20 minutes at a room temperature.

As a result, 0.26 g of polymers were obtained. The polymers obtained had a number average molecular chain length (An) of 990 and a molecular weight distribution (Aw/An) of 2.0.

Example 3

Polymerization was carried out in the same manner as in Example 1 except that: chloro(methyl)[N,N'-(1,2-dihydroacenaphthylene-1,2-diylidene)bis(2,6-diisopropylaniline-κN)]palladium was changed to chloro(methyl)[N,N'-(1,2-dihydroacenaphthylene-1,2-diylidene)bis(2,4,6-trimethylaniline-κN)]palladium; an amount of sodiumtetrakis{3,5-bis(trifluoromethyl)phenyl}borate was changed to 0.020 mmol; an amount of vinylcyclohexane was changed to 20 mmol; 1-hexene (1.5 mmol) was changed to cyclopentene (0.34 g, 5.0 mmol); and a reaction time was arranged to be 3 hours.

As a result, 0.863 g of polymers were obtained.

Example 4

Polymerization was carried out in the same manner as in Example 3 except that cyclopentene was changed to cyclohexene (0.41 g, 5.0 mmol).

As a result, 1.08 g of polymers were obtained.

Example 5

Polymerization was carried out in the same manner as in Example 3 except that vinylcyclohexane (15 mmol) was change to allylcyclohexane (15 mmol).

As a result, 0.537 g of polymers were obtained.

Example 6

Polymerization was carried out in the same manner as in Example 5 except that cyclopentene was changed to cyclohexene (0.41 g, 5.0 mmol).

As a result, 1.203 g of polymers were obtained.

$^{13}$C-NMR analysis of the polymers obtained in Examples 1 to 6 confirmed signals due to methylene chain and a short chain branch derived from 1-hexene around 22 to 31 ppm and two signals due to cyclohexyl ring around 33 to 40 ppm. Each polymer was identified as the polymer containing a ring structure of 1,4-trans configuration in comparison with low molecular weight model compounds.

Example 7

Industrial hexane (24 mL) and vinylcyclohexane (1917 mL) were added to a 5 L stainless steel vessel in which the air was replaced by dry nitrogen gas, and then were heated to 35° C. Further, 50 kPa (partial pressure) of ethylene was introduced into the vessel. A solution of chloro(methyl)[N,N'-(1,2-dihydroacenaphthylene-1,2-diylidene)bis(2,6-diisopropylaniline-κN)]palladium (132 mg, 0.2 mmol) dissolved into 1,2-dichloroethane (10.4 mL) and a solution of lithium tetrakis(pentafluorophenyl)borate-ethyl ether complex purchased from Tokyo Kasei Kogyo co., ltd. (235 mg) dissolved into 1,2-dichloroethane (9.3 mL) were stirred in a flask for two minutes and added to the stainless steel vessel.

The temperature of the vessel was kept at 35° C. and the ethylene partial pressure was kept to 50 kPa, and the mixed solution in the vessel was stirred for 540 minutes. Then, acetonitrile (5 mL) was added to the vessel as a deactivation reagent and the mixed solution in the vessel was stirred. The solution in the vessel was added into acetone (4 L). The precipitated polymers were isolated by filtration and dried under vacuum at 120° C. As a result, 10 g of polymers were obtained.

In DSC measurement, the following was found about the polymers obtained: a melting point was 200° C.; a crystallization temperature was 191° C.; a glass transition point was 40° C.; a number average molecular chain length (An) was 1100; a molecular weight distribution (Aw/An) was 1.8; and an inherent viscosity was 0.68 dL/g.

From $^{13}$C-NMR and DEPT spectroscopy, a signal of tertiary carbon in 1,4-transcyclohexenyl structure was observed at 38.5 ppm and a signal of secondary carbon in 1,4-transcyclohexenyl structure was observed at 33.6 ppm. Furthermore, signals due to secondary carbons were observed around 34.8 ppm.

Main peaks observed in $^{13}$C-NMR and DEPT spectra of the polymers are as follows:
(Tertiary carbon) 43.3 ppm, 38.6 ppm, 38.5 ppm, 38.3 ppm, and 38.1 ppm;
(Secondary carbon) 37.6 ppm, 35.5 ppm, 34.8 ppm, 33.9 ppm, 33.8 ppm, 33.6 ppm, 31.6 ppm, 30.8 ppm, 30.0 ppm, 29.1 ppm, 27.4 ppm, 27.0 ppm, 26.9 ppm, and 26.4 ppm; and
(Primary carbon) 16.3 ppm.

The structures of vinylcyclohexane unit in the polymers were represented by the following formulae (i) and (ii). A $^{13}$C-NMR signal of the carbon z in the formula (ii) was observed at 43.3 ppm. A ratio of an area of the signals between 38.0 and 38.7 ppm due to tertiary carbons in 1,4-transcyclohexenyl structure to a total area of the signals due to all the tertiary carbons but carbon z in the formula (ii) in the polymers was 85%. Therefore, a ratio of 1,4-transcyclohexenyl structure in the polymers was estimated as 85%.

[Chem. 14]

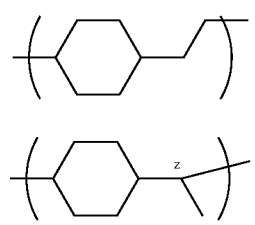

An ethylene content of the polymers was calculated from a total area of the signals due to secondary carbons (25 to 37.8 ppm), an area of a signal at 43.3 ppm, and the total area of the signals due to all the tertiary carbons but carbon z in the formula (ii) (37.8 to 43 ppm). As a result, the ethylene content was estimated as 53 mol % on the condition that the total amount of vinylcycloehexane unit and ethylene unit was 100 mol %.

Example 8

Polymerization was carried out in the same manner as in Example 7 except that: the amount of industrial hexane was changed to 571 mL; the amount of vinylcyclohexane was changed to 1369 mL; and an ethylene partial pressure was changed to 100 kPa. As a result, 74.5 g of polymers were obtained.

In DSC measurement, the following was found about the polymers obtained: a melting point was 160° C.; a glass transition point was 32.3° C.; a number average molecular chain length (An) was 1030; a molecular weight distribution (Aw/An) was 1.9; and an inherent viscosity was 0.64 dL/g.

From $^{13}$C-NMR and DEPT spectroscopy, a signal of tertiary carbon in 1,4-transcyclohexenyl structure was observed at 38.5 ppm and a signal of secondary carbon in 1,4-transcyclohexenyl structure was observed at 33.6 ppm. Furthermore, signals due to secondary carbons were observed around 34.8 ppm.

Main peaks observed in $^{13}$C-NMR and DEPT spectra of the polymers are as follows:
(Tertiary carbon) 43.3 ppm, 38.6 ppm, 38.5 ppm, 38.3 ppm, and 38.1 ppm;
(Secondary carbon) 37.6 ppm, 35.5 ppm, 34.8 ppm, 33.9 ppm, 33.8 ppm, 33.6 ppm, 31.6 ppm, 30.8 ppm, 30.0 ppm, 29.1 ppm, 27.4 ppm, 27.0 ppm, 26.9 ppm, and 26.4 ppm; and
(Primary carbon) 22.4 ppm, 16.3 ppm, and 13.6 ppm.

The structures of vinylcyclohexane unit in the polymers were represented by the above formulae (i) and (ii). A $^{13}$C-NMR signal of the carbon z in the above formula (ii) was observed at 43.3 ppm. The ratio of the area of the signals between 38.0 and 38.7 ppm due to tertiary carbons in 1,4-transcyclohexenyl structure to the total area of the signals due to all the tertiary carbons but carbon z in the above formula (ii) in the polymers was 81%. Therefore, the ratio of 1,4-transcyclohexenyl structure in the polymers was estimated as 81%.

The ethylene content of the polymers was calculated from the total area of the signals due to secondary carbons (25 to 37.8 ppm), the area of the signal at 43.3 ppm, and the total area of the signals due to all the tertiary carbons but carbon z in the above formula (ii) (37.8 to 43 ppm). As a result, the ethylene content was estimated as 72 mol % on the condition that the total amount of vinylcycloehexane unit and ethylene unit was 100 mol %.

Example 9

Industrial hexane (561 mL) and vinylcyclohexane (1369 mL) were added to a 5 L stainless steel vessel in which the air was replaced by dry nitrogen gas, and then were heated to 35° C. 40 kPa (partial pressure) of 1-butene was introduced into the vessel. A solution of chloro(methyl)[N,N'-(1,2-dihydroacenaphthylene-1,2-diylidene)bis(2,6-diisopropylaniline-κN)]palladium (132 mg, 0.2 mmol) dissolved into 1,2-dichloroethane (10.4 mL) and a solution of lithium tetrakis (pentafluorophenyl)borate-ethyl ether complex purchased from Tokyo Kasei Kogyo co., ltd. (235 mg) dissolved into 1,2-dichloroethane (9.3 mL) were stirred in a flask for two minutes and added to the stainless steel vessel.

The temperature of the vessel was kept at 35° C. and the 1-butene partial pressure was kept to 50 kPa, and the mixed solution in the vessel was stirred for 540 minutes. Then, acetonitrile (5 mL) was added to the vessel as a deactivation reagent and the mixed solution in the vessel was stirred. The solution in the vessel was added into acetone (4 L). The precipitated polymers were isolated by filtration and dried under vacuum at 120° C. As a result, 60 g of polymers were obtained.

In DSC measurement, the following was found about the polymers obtained: a melting point was 251° C.; a glass transition point was 28° C.; a number average molecular chain length (An) was 1350; a molecular weight distribution (Aw/An) was 1.9; and an inherent viscosity was 0.94 dL/g.

From $^{13}$C-NMR and DEPT spectroscopy, a signal of tertiary carbon in 1,4-transcyclohexenyl structure was observed at 38.5 ppm and a signal of secondary carbon in 1,4-transcyclohexenyl structure was observed at 33.6 ppm. Furthermore, signals due to secondary carbons were observed around 34.8 ppm.

Main peaks observed in $^{13}$C-NMR and DEPT spectra of the polymers are as follows:
(Tertiary carbon) 43.3 ppm, 38.6 ppm, 38.5 ppm, 38.3 ppm, and 38.1 ppm;
(Secondary carbon) 37.6 ppm, 34.8 ppm, 34.4 ppm, 33.9 ppm, 33.8 ppm, 33.6 ppm, 30.8 ppm, 30.0 ppm, 29.6 ppm, 29.1 ppm, 28.1 ppm, 27.4 ppm, and 27.0 ppm; and
(Primary carbon) 16.3 ppm.

The structures of vinylcyclohexane unit in the polymers were represented by the above formulae (i) and (ii). A $^{13}$C-NMR signal of the carbon z in the above formula (ii) was observed at 43.3 ppm. The ratio of the area of the signals between 38.0 and 38.7 ppm due to tertiary carbons in 1,4-transcyclohexenyl structure to the total area of the signals due to all the tertiary carbons but carbon z in the above formula (ii) in the polymers was 97%. Therefore, the ratio of 1,4-transcyclohexenyl structure in the polymers was estimated as 97%.

A 1-butene content of the polymers was calculated from the area of signals due to secondary carbons (25 to 37.8 ppm), the area of a signal at 43.3 ppm, and the total area of the signals due to all the tertiary carbons but carbon z in the above formula (ii) (37.8 to 43 ppm). As a result, the 1-butene content was estimated as 46 mol % on the condition that the total amount of vinylcycloehexane unit and 1-butene unit was 100 mol %.

Example 10

Industrial hexane (561 mL) and vinylcyclohexane (1369 mL) were added to a 5 L stainless steel vessel in which the air was replaced by dry nitrogen gas, and then were heated to 35° C. Further, 100 kPa (partial pressure) of propylene was introduced into the vessel. A solution of chloro(methyl)[N,N'-(1,2-dihydroacenaphthylene-1,2-diylidene)bis(2,6-diisopropylaniline-κN)]palladium (132 mg, 0.2 mmol) dissolved into 1,2-dichloroethane (10.4 mL) and a solution of lithium tetrakis(pentafluorophenyl)borate-ethyl ether complex purchased from Tokyo Kasei Kogyo co., ltd. (235 mg) dissolved into 1,2-dichloroethane (9.3 mL) were stirred in a flask for two minutes and added to the stainless steel vessel.

The temperature of the vessel was kept at 35° C. and the propylene partial pressure was kept to 100 kPa, and the mixed solution in the vessel was stirred for 540 minutes. Then, acetonitrile (5 mL) was added to the vessel as a deactivation reagent and the mixed solution in the vessel was stirred. The solution in the vessel was added into acetone (4 L). The precipitated polymers were isolated by filtration and dried under vacuum at 120° C. As a result, 84.6 g of polymers were obtained.

In DSC measurement, the following was found about the polymers obtained: a melting point was 273° C.; a glass transition point was 43° C.; a number average molecular chain length (An) was 1990; a molecular weight distribution (Aw/An) was 1.6; and an inherent viscosity was 1.07 dL/g.

From $^{13}$C-NMR and DEPT spectroscopy, a signal of tertiary carbon in 1,4-transcyclohexenyl structure was observed at 38.5 ppm and a signal of secondary carbon in 1,4-transcyclohexenyl structure was observed at 33.6 ppm. Furthermore, signals due to secondary carbons were observed around 34.8 ppm.

Main peaks observed in $^{13}$C-NMR and DEPT spectra of the polymers are as follows:
(Tertiary carbon) 43.3 ppm, 38.6 ppm, 38.5 ppm, 38.3 ppm, 38.1 ppm, and 38.0 ppm;
(Secondary carbon) 37.6 ppm, 34.8 ppm, 34.4 ppm, 33.9 ppm, 33.8 ppm, 33.6 ppm, 30.8 ppm, 30.5 ppm, 30.0 ppm, 29.6 ppm, 29.1 ppm, 27.0 ppm, and 25.0 ppm; and
(Primary carbon) 16.3 ppm.

The structures of vinylcyclohexane unit in the polymers were represented by the above formulae (i) and (ii). A $^{13}$C-NMR signal of the carbon z in the above formula (ii) was observed at 43.3 ppm. The ratio of the area of the signals between 38.0 and 38.7 ppm due to tertiary carbons in 1,4-transcyclohexenyl structure to the total area of the signals due to all the tertiary carbons but carbon z in the above formula (ii) in the polymers was 94%. Therefore, the ratio of 1,4-transcyclohexenyl structure in the polymers was estimated as 94%.

A propylene content of the polymers was calculated from the total area of the signals due to secondary carbons (25 to 37.8 ppm), the area of the signal at 43.3 ppm, and the total area of the signals due to all the tertiary carbons but carbon z in the above formula (ii) (37.8 to 43 ppm). As a result, the propylene content was estimated as 39 mol % on the condition that the total amount of vinylcycloehexane unit and propylene unit was 100 mol %.

Example 11

Industrial hexane (3 mL) and vinylcyclohexane (57 mL) were added to a 400 mL stainless steel vessel in which the air was replaced by dry nitrogen gas, and then heated to 35° C. Propylene (7.6 g) was introduced into the vessel.

A solution of chloro(methyl)[N,N'-(1,2-dihydroacenaphthylene-1,2-diylidene)bis(2,6-diisopropylaniline-κN)]palladium (32.9 mg, 0.05 mmol) dissolved into chlorobenzene (7.4 mL) and a solution of sodium tetrakis{3,5-bis(trifluoromethyl)phenyl}borate (88.6 mg) dissolved into chlorobenzene (20 mL) were stirred in a flask for two minutes and added to the vessel.

The temperature of the vessel was kept at 35° C. and the mixed solution in the vessel was stirred for 180 minutes. Then, acetonitrile (5 mL) was added to the vessel as a deactivation reagent and the mixed solution in the vessel was stirred. The solution in the vessel was added into acetone (500 mL). The precipitated polymers were isolated by filtration and dried under vacuum at 120° C. As a result, 6.8 g of polymers were obtained.

In DSC measurement, the following was found about the polymers obtained: a melting point was 127° C.; a glass transition point was 3° C.; a number average molecular chain length (An) was 910; a molecular weight distribution (Aw/An) was 1.9; and an inherent viscosity was 0.60 dL/g.

From $^{13}$C-NMR and DEPT spectroscopy, a signal of tertiary carbon in 1,4-transcyclohexenyl structure was observed at 38.5 ppm and a signal of secondary carbon in 1,4-transcyclohexenyl structure was observed at 33.6 ppm. Furthermore, signals due to secondary carbons were observed around 34.8 ppm.

Main peaks observed in $^{13}$C-NMR and DEPT spectra of the polymers are as follows:
(Tertiary carbon) 43.3 ppm, 38.6 ppm, 38.5 ppm, 38.3 ppm, 38.1 ppm, and 38.0 ppm;
(Secondary carbon) 37.6 ppm, 34.8 ppm, 34.4 ppm, 33.9 ppm, 33.6 ppm, 30.8 ppm, 30.5 ppm, 30.0 ppm, 29.6 ppm, 29.1 ppm, 27.0 ppm, and 25.0 ppm; and
(Primary carbon) 20.6 ppm, 19.6 ppm, and 16.3 ppm.

The structures of vinylcyclohexane unit in the polymers were represented by the above formulae (i) and (ii). A $^{13}$C-NMR signal of the carbon z in the above formula (ii) was observed at 43.3 ppm. The ratio of the area of the signals between 37.9 and 38.7 ppm due to tertiary carbons in 1,4-transcyclohexenyl structure to the total area of the signals due to all the tertiary carbons but carbon z in the above formula (ii) in the polymers was 90%. Therefore, the ratio of 1,4-transcyclohexenyl structure in the polymers was estimated as 90%.

A propylene content of the polymers was calculated from the total area of the signals due to secondary carbons (25 to 37.8 ppm), the area of the signal at 43.3 ppm, and the total area of the signals due to all the tertiary carbons but carbon z in the above formula (ii) (37.8 to 43 ppm). As a result, the propylene content was estimated as 52 mol % on the condition that the total amount of vinylcycloehexane unit and propylene unit was 100 mol %.

Example 12

Industrial hexane (44 mL), vinylcyclohexane (139 mL), and 1-hexene (22.6 mL) were added to a 400 mL stainless steel vessel in which the air was replaced by dry nitrogen gas, and then were heated to 35° C.

A solution of chloro(methyl)[N,N'-(1,2-dihydroacenaphthylene-1,2-diylidene)bis(2,6-diisopropylaniline-κN)]palladium (32.9 mg, 0.05 mmol) dissolved into 1,2-dichloroethane (2.6 mL) and a solution of sodium tetrakis{3,5-bis(trifluoromethyl)phenyl}borate (53 mg) dissolved into 1,2-dichloroethane (2.1 mL) were stirred in a flask for two minutes and added to the stainless steel vessel.

The temperature of the vessel was kept at 35° C. and the mixed solution in the vessel was stirred for 180 minutes. Then, acetonitrile (5 mL) was added to the vessel as a deactivation reagent and the mixed solution in the vessel was stirred. The solution in the vessel was added into acetone (500 mL). The precipitated polymers were isolated by filtration and dried under vacuum at 120° C. As a result, 11.2 g of polymers were obtained.

In DSC measurement, the following was found about the polymers obtained: a melting point was 174° C.; a glass transition point was −8° C.; a number average molecular chain length (An) was 940; a molecular weight distribution (Aw/An) was 2.0; and an inherent viscosity was 0.70 dL/g.

From $^{13}$C-NMR and DEPT spectroscopy, a signal of tertiary carbon in 1,4-transcyclohexenyl structure was observed at 38.5 ppm and a signal of secondary carbon in 1,4-transcyclohexenyl structure was observed at 33.6 ppm. Furthermore, signals due to secondary carbons were observed around 34.8 ppm.

Main peaks observed in $^{13}$C-NMR and DEPT spectra of the polymers are as follows:
(Tertiary carbon) 43.3 ppm, 38.6 ppm, 38.5 ppm, 38.3 ppm, and 38.1 ppm
(Secondary carbon) 37.6 ppm, 37.2 ppm, 34.8 ppm, 34.4 ppm, 33.9 ppm, 33.8 ppm, 33.6 ppm, 30.8 ppm, 30.0 ppm, 29.6 ppm, 29.1 ppm, 27.6 ppm, and 27.0 ppm; and
(Primary carbon) 19.6 ppm and 16.3 ppm.

The structures of vinylcyclohexane unit in the polymers were represented by the above formulae (i) and (ii). A $^{13}$C-NMR signal of the carbon z in the above formula (ii) was observed at 43.3 ppm. The ratio of the total area of the signals between 38.0 and 38.7 ppm due to tertiary carbons in 1,4-transcyclohexenyl structure to the total area of the signals due to all the tertiary carbons but carbon z in the above formula (ii) in the polymers was 93%. Therefore, the ratio of 1,4-transcyclohexenyl structure in the polymers was estimated as 93%.

A 1-hexene content of the polymers was calculated from the total area of the signals due to secondary carbons (25 to 37.8 ppm), the area of the signal at 43.3 ppm, and the total area of the signals due to all the tertiary carbons but carbon z in the above formula (ii) (37.8 to 43 ppm). As a result, the 1-hexene content was estimated as 46 mol % on the condition that the total amount of vinylcycloehexane unit and 1-hexene unit was 100 mol %.

Example 13

Industrial hexane (40 mL), vinylcyclohexane (147 mL), and 1-octene (18.7 mL) were added to a 400 mL stainless steel vessel in which the air was replaced by dry nitrogen gas, and then were heated to 35° C.

A solution of chloro(methyl)[N,N'-(1,2-dihydroacenaphthylene-1,2-diylidene)bis(2,6-diisopropylaniline-κN)]palladium (32.9 mg, 0.05 mmol) dissolved into 1,2-dichloroethane (2.6 mL) and a solution of lithium tetrakis(pentafluorophenyl)borate-ethyl ether complex (59 mg) dissolved into 1,2-dichloroethane (2.1 mL) were stirred in a flask for two minutes and added to the stainless steel vessel.

The temperature of the vessel was kept at 35° C. and the mixed solution in the vessel was stirred for 180 minutes. Then, acetonitrile (5 mL) was added to the vessel as a deactivation reagent and the mixed solution in the vessel was stirred. The solution in the vessel was added into acetone (500 mL). The precipitated polymers were isolated by filtration and dried under vacuum at 120° C. As a result, 5.4 g of polymers were obtained.

In DSC measurement, the following was found about the polymers obtained: a melting point was 253° C.; a glass transition point was −2.7° C.; a number average molecular chain length (An) was 900; a molecular weight distribution (Aw/An) was 2.4; and an inherent viscosity was 0.85 dL/g.

From $^{13}$C-NMR and DEPT spectroscopy, a signal of tertiary carbon in 1,4-transcyclohexenyl structure was observed at 38.5 ppm and a signal of secondary carbon in 1,4-transcyclohexenyl structure was observed at 33.6 ppm. Furthermore, signals due to secondary carbons were observed around 34.8 ppm.

Main peaks observed in $^{13}$C-NMR and DEPT spectra of the polymers are as follows:
(Tertiary carbon) 43.3 ppm, 38.6 ppm, 38.5 ppm, 38.3 ppm, and 38.1 ppm;
(Secondary carbon) 37.6 ppm, 37.2 ppm, 34.8 ppm, 34.4 ppm, 33.9 ppm, 33.8 ppm, 33.6 ppm, 30.8 ppm, 30.0 ppm, 29.6 ppm, 29.1 ppm, 27.6 ppm, and 27.0 ppm; and
(Primary carbon) 16.3 ppm.

The structures of vinylcyclohexane unit in the polymers were represented by the above formulae (i) and (ii). A $^{13}$C-NMR signal of the carbon z in the above formula (ii) was observed at 43.3 ppm. The ratio of the area of the signals between 38.0 and 38.7 ppm due to tertiary carbons in 1,4-transcyclohexenyl structure to the total area of the signals due to all the tertiary carbons but carbon z in the above formula (ii) in the polymers was 94%. Therefore, the ratio of 1,4-transcyclohexenyl structure in the polymers was estimated as 94%.

A 1-octene content of the polymers was calculated from the total area of the signals due to secondary carbons (25 to 37.8 ppm), the area of the signal at 43.3 ppm, and the total area of the signals due to all the tertiary carbons but carbon z in the above formula (ii) (37.8 to 43 ppm). As a result, the 1-octene content was estimated as 46 mol % on the condition that the total amount of vinylcycloehexane unit and 1-octene unit was 100 mol %.

Example 14

Industrial hexane (22 mL), vinylcyclohexane (130 mL), and 1-dodecene (53.2 mL) were added to a 400 mL stainless steel vessel in which the air was replaced by dry nitrogen gas, and then heated to 35° C.

A solution of chloro(methyl)[N,N'-(1,2-dihydroacenaphthylene-1,2-diylidene)bis(2,6-diisopropylaniline-κN)]palladium (32.9 mg, 0.05 mmol) dissolved into 1,2-dichloroethane (2.6 mL) and a solution of sodium tetrakis{3,5-bis(trifluoromethyl)phenyl}borate (53 mg) dissolved into 1,2-dichloroethane (2.1 mL) were stirred in a flask for two minutes and added to the stainless steel vessel.

The temperature of the vessel was kept at 35° C. and the mixed solution in the vessel was stirred for 180 minutes. Then, acetonitrile (5 mL) was added to the vessel as a deactivation reagent and the mixed solution in the vessel was stirred. The solution in the vessel was added into acetone (500 mL). The precipitated polymers were isolated by filtration and dried under vacuum at 120° C. As a result, 7.8 g of polymers were obtained.

In DSC measurement, the following was found about the polymers obtained: a melting point was 65° C.; a glass transition point was −23° C.; a number average molecular chain length (An) was 880; a molecular weight distribution (Aw/An) was 2.0; and an inherent viscosity was 0.60 dL/g.

From $^{13}$C-NMR and DEPT spectroscopy, a signal of tertiary carbon in 1,4-transcyclohexenyl structure was observed at 38.5 ppm and a signal of secondary carbon in 1,4-transcyclohexenyl structure was observed at 33.6 ppm. Furthermore, signals due to secondary carbons were observed around 34.8 ppm.

Main peaks observed in $^{13}$C-NMR and DEPT spectra of the polymers are as follows:
(Tertiary carbon) 43.3 ppm, 43.2 ppm, 38.6 ppm, 38.5 ppm, 38.3 ppm, and 38.1 ppm;
(Secondary carbon) 37.6 ppm, 37.2 ppm, 34.8 ppm, 34.4 ppm, 34.3 ppm, 33.9 ppm, 33.8 ppm, 33.6 ppm, 32.9 ppm, 30.8 ppm, 30.0 ppm, 29.6 ppm, 29.1 ppm, 27.6 ppm, and 27.0 ppm; and
(Primary carbon) 16.3 ppm.

The structures of vinylcyclohexane unit in the polymers were represented by the above formulae (i) and (ii). $^{13}$C-NMR signals of the carbon z in the above formula (ii) were observed at 43.2 and 43.3 ppm. The ratio of the area of the signals between 38.0 and 38.7 ppm due to tertiary carbons in 1,4-transcyclohexenyl structure to the total area of the signals due to all the tertiary carbons but carbon z in the above formula (ii) in the polymers was 93%. Therefore, the ratio of 1,4-transcyclohexenyl structure in the polymers was estimated as 93%.

A 1-dodecene content of the polymers was calculated from the total area of the signals due to secondary carbons (25 to 37.8 ppm), the areas of the signals at 43.2 and 43.3 ppm, and the total area of the signals due to all the tertiary carbons but carbon z in the above formula (ii) (37.8 to 43 ppm). As a result, the 1-dodecene content was estimated as 55 mol % on the condition that the total amount of vinylcycloehexane unit and 1-dodecene unit was 100 mol %.

Example 15

Industrial hexane (161 mL), vinylcyclohexane (13.6 mL), and cyclohexene (30.4 mL) were added to 400 mL stainless steel vessel in which the air was replaced by dry nitrogen gas, and then were heated to 35° C.

A solution of chloro(methyl)[N,N'-(1,2-dihydroacenaphthylene-1,2-diylidene)bis(2,4,6-trimethylaniline-κN)]palladium (28.7 mg, 0.05 mmol) dissolved into 1,2-dichloroethane (2.3 mL) and a solution of lithium tetrakis(pentafluorophenyl)borate-ethyl ether complex (59 mg) dissolved into 1,2-dichloroethane (2.3 mL) were stirred in a flask for two minutes and added to the stainless steel vessel.

The temperature of the vessel was kept at 35° C. and the mixed solution in the vessel was stirred for 180 minutes. Then, acetonitrile (5 mL) was added to the vessel as a deactivation reagent and the mixed solution in the vessel was stirred. The solution in the vessel was added into acetone (500 mL). The precipitated polymers were isolated by filtration and dried under vacuum at 120° C. As a result, 3.5 g of polymers were obtained.

In DSC measurement, the following was found about the polymers obtained: a glass transition point was 95.2° C.; and an inherent viscosity was 0.20 dL/g.

From $^{13}$C-NMR and DEPT spectroscopy, a signal of tertiary carbon in 1,4-transcyclohexenyl structure was observed at 38.5 ppm and a signal of secondary carbon in 1,4-transcyclohexenyl structure was observed at 33.6 ppm. Furthermore, signals due to secondary carbons were observed around 34.8 ppm.

Main peaks observed in $^{13}$C-NMR and DEPT spectra of the polymers are as follows:
(Tertiary carbon) 42.3 ppm, 41.8 ppm, 39.9 ppm, 38.6 ppm, 38.5 ppm, and 38.3 ppm; and
(Secondary carbon) 34.8 ppm, 34.4 ppm, 34.3 ppm, 33.9 ppm, 33.8 ppm, 33.6 ppm, 32.7 ppm, 31.8 ppm, 31.0 ppm, 30.9 ppm, 30.7 ppm, 26.8 ppm, 26.4 ppm, and 26.1 ppm.

The ratio of the area of the signals between 38.1 and 38.7 ppm due to tertiary carbons in 1,4-transcyclohexenyl structure to the total area of the signals due to all the tertiary carbons in the polymers was 66%. Therefore, the ratio of 1,4-transcyclohexenyl structure in the polymers was estimated as 66%.

Example 16

Industrial hexane (160 mL), vinylcyclohexane (17.7 mL), and cyclopentene (17.7 mL) were added to 400 mL stainless steel vessel in which the air was replaced by dry nitrogen gas, and then were heated to 35° C.

A solution of chloro(methyl)[N,N'-(1,2-dihydroacenaphthylene-1,2-diylidene)bis(2,4,6-trimethylaniline-κN)]palladium (28.7 mg, 0.05 mmol) dissolved into 1,2-dichloroethane (2.3 mL) and a solution of lithium tetrakis(pentafluorophenyl)borate-ethyl ether complex (59 mg) dissolved into 1,2-dichloroethane (2.3 mL) were stirred in a flask for two minutes and added to the stainless steel vessel.

The temperature of the vessel was kept at 35° C. and the mixed solution in the vessel was stirred for 180 minutes. Then, acetonitrile (5 mL) was added to the vessel as a deactivation reagent and the mixed solution in the vessel was stirred. The solution in the vessel was added into acetone (500 mL). The precipitated polymers were isolated by filtration and dried under vacuum at 120° C. As a result, 0.2 g of polymers were obtained.

In DSC measurement, a glass transition point of the polymers obtained was 89.2° C.

From $^{13}$C-NMR and DEPT spectroscopy, a signal of tertiary carbon in 1,4-transcyclohexenyl structure was observed at 38.5 ppm and a signal of secondary carbon in 1,4-transcyclohexenyl structure was observed at 33.6 ppm. Furthermore, signals due to secondary carbons were observed around 34.8 ppm.

Main peaks observed in $^{13}$C-NMR and DEPT spectra of the polymers are as follows:

(Tertiary carbon) 46.7 ppm, 46.4 ppm, 43.7 ppm, 40.6 ppm, 40.5 ppm, 38.5 ppm, and 38.3 ppm; and (Secondary carbon) 36.4 ppm, 34.8 ppm, 33.9 ppm, 33.8 ppm, 33.6 ppm, 32.7 ppm, 31.8 ppm, 30.5 ppm, 29.6 ppm, 26.8 ppm, and 26.4 ppm.

The ratio of the area of the signals between 38.0 and 38.6 ppm due to tertiary carbons in 1,4-transcyclohexenyl structure to the total area of the signals due to all the tertiary carbons in the polymers was 54%. Therefore, the ratio of 1,4-transcyclohexenyl structure in the polymers was estimated as 54%.

INDUSTRIAL APPLICABILITY

A polymer of the present invention can be applied to, for example, parts of automobiles, parts of domestic electronic products, and optical materials.

The invention claimed is:

1. A copolymer comprising a monomer unit represented by a following formula (1) and an olefin unit:

[Chem. 1]

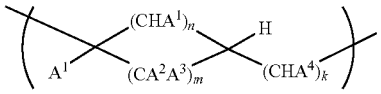

(1)

wherein: each of $A^1$, $A^2$, $A^3$, and $A^4$ independently represents a hydrogen atom, a halogen atom, an alkyl group, an aralkyl group, an aryl group, a silyl group, a siloxy group, an alkoxy group, an aralkyloxy group, an aryloxy group, an amino group, an amide group, an imide group, or a hydrocarbon thio group; which group may have a substituent; and each of m, n, and k is independently an integer in a range of 2 to 20.

2. The copolymer as set forth in claim 1, wherein:

the monomer unit represented by the formula (1) is represented by a following formula (2):

[Chem. 2]

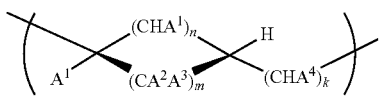

(2)

wherein: each of $A^1$, $A^2$, $A^3$, and $A^4$ independently represents a hydrogen atom, a halogen atom, an alkyl group, an aralkyl group, an aryl group, a silyl group, a siloxy group, an alkoxy group, an aralkyloxy group, an aryloxy group, an amino group, an amide group, an imide group, or a hydrocarbon thio group; each of $A^1$, $A^2$, $A^3$, and $A^4$ is independently any of these groups at different carbons to which the each of $A^1$, $A^2$, $A^3$, and $A^4$ is bonded, and $A^1$, $A^2$, $A^3$, and $A^4$ may be bonded to each other; and each of m, n, and k is independently an integer in a range of 2 to 20.

3. The copolymer as set forth in claim 1, wherein:

the monomer unit represented by the formula (1) is represented by a following formula (3):

[Chem. 3]

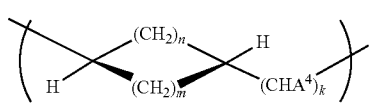

(3)

wherein: $A^4$ represents a hydrogen atom, a halogen atom, an alkyl group, an aralkyl group, an aryl group, a silyl group, a siloxy group, an alkoxy group, an aralkyloxy group, an aryloxy group, an amino group, an amide group, an imide group, or a hydrocarbon thio group; and each of m, n, and k is independently an integer in a range of 2 to 20.

4. The copolymer as set forth in claim 1, wherein:

the monomer unit represented by the formula (1) is represented by a following formula (4):

[Chem. 4]

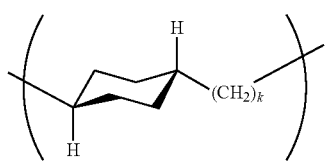

(4)

wherein k is an integer in a range of 2 to 20.

5. The copolymer as set forth in claim 1, wherein:

70 to 100 mol % of the monomer unit represented by the formula (1) has a trans-configuration cyclic structure.

6. The copolymer as set forth in claim 1, wherein:

a molar ratio of the monomer unit represented by the formula (1) to olefin unit is 99/1 to 1/99.

7. A method for producing a copolymer including a monomer unit represented by a following formula (1) and an olefin unit, the method comprising the step of:

copolymerizing a compound represented by a following Formula (5) and olefin:

[Chem. 5]

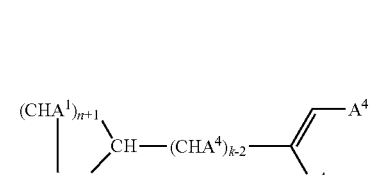

(5)

wherein: each of $A^1$, $A^2$, $A^3$, and $A^4$ independently represents a hydrogen atom, a halogen atom, an alkyl group, an aralkyl group, an aryl group, a silyl group, a siloxy group, an alkoxy group, an aralkyloxy group, an aryloxy group, an amino group, an amide group, an imide group, or a hydrocarbon thio group; each of $A^1$, $A^2$, $A^3$, and $A^4$ is independently any of these groups at different carbons to which the each of $A^1$, $A^2$, $A^3$, and $A^4$ is bonded, and $A^1$, $A^2$, $A^3$, and $A^4$ may be bonded to each other; and each of m, n, and k is independently an integer in a range of 2 to 20, the formula (1) being as follows:

[Chem. 6]

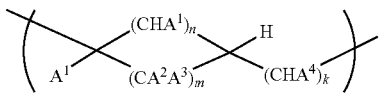
(1)

wherein: each of $A^1$, $A^2$, $A^3$, and $A^4$ independently represents a hydrogen atom, a halogen atom, an alkyl group, an aralkyl group, an aryl group, a silyl group, a siloxy group, an alkoxy group, an aralkyloxy group, an aryloxy group, an amino group, an amide group, an imide group, or a hydrocarbon thio group; each of $A^1$, $A^2$, $A^3$, and $A^4$ is independently any of these groups at different carbons to which the each of $A^1$, $A^2$, $A^3$, and $A^4$ is bonded, and $A^1$, $A^2$, $A^3$, and $A^4$ may be bonded to each other; and each of m, n, and k is independently an integer in a range of 2 to 20.

8. The method as set forth in claim 7, wherein:
the monomer unit represented by the formula (1) is represented by a following formula (2):

[Chem. 7]

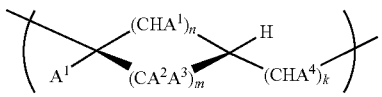
(2)

wherein: each of $A^1$, $A^2$, $A^3$, and $A^4$ independently represents a hydrogen atom, a halogen atom, an alkyl group, an aralkyl group, an aryl group, a silyl group, a siloxy group, an alkoxy group, an aralkyloxy group, an aryloxy group, an amino group, an amide group, an imide group, or a hydrocarbon thio group; each of $A^1$, $A^2$, $A^3$, and $A^4$ is independently any of these groups at different carbons to which the each of $A^1$, $A^2$, $A^3$, and $A^4$ is bonded, and $A^1$, $A^2$, $A^3$, and $A^4$ may be bonded to each other; and each of m, n, and k is independently an integer in a range of 2 to 20.

9. The method as set froth in claim 7, wherein:
the compound represented by the formula (5) is represented by a following formula (6):

[Chem. 8]

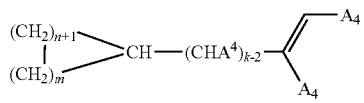
(6)

wherein: $A^4$ represents a hydrogen atom, a halogen atom, an alkyl group, an aralkyl group, an aryl group, a silyl group, a siloxy group, an alkoxy group, an aralkyloxy group, an aryloxy group, an amino group, an amide group, an imide group, or a hydrocarbon thio group; and each of m, n, and k is independently an integer in a range of 2 to 20; and
the monomer unit represented by the formula (1) is represented by a following formula (3):

[Chem. 9]

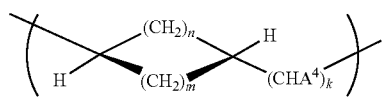
(3)

wherein: $A^4$ represents a hydrogen atom, a halogen atom, an alkyl group, an aralkyl group, an aryl group, a silyl group, a siloxy group, an alkoxy group, an aralkyloxy group, an aryloxy group, an amino group, an amide group, an imide group, or a hydrocarbon thio group; and each of m, n, and k is independently an integer in a range of 2 to 20.

10. The method as set forth in claim 7, wherein:
the compound represented by the formula (5) is α-alkenylcyclohexane, the α-alkenylcyclohexane having an α-alkenyl group having 2 to 20 carbon atoms; and
the monomer unit represented by the formula (1) is represented by a following formula (4):

[Chem. 10]

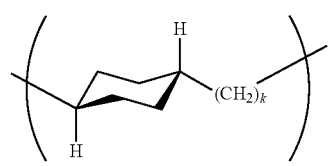
(4)

wherein k represents a natural number in a range of 2 to 20.

11. The method as set forth in claim 7, wherein polymerization is carried out in presence of a catalyst prepared by putting a boron compound and a transition metal compound in contact with each other.

12. The method as set forth in claim 11, wherein:
the transition metal compound is represented by a following formula (7):

[Chem. 11]

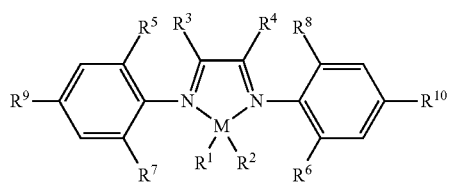
(7)

wherein: M represents an iron atom, a cobalt atom, a nickel atom, a palladium atom, or a copper atom; each of $R^1$ and $R^2$ independently represents a hydrogen atom, a halogen atom, an alkyl group, an aralkyl group, an aryl group, an alkoxy group, an aralkyloxy group, or an aryloxy group; each of $R^3$ to $R^{10}$ independently represents a hydrogen atom, a halogen atom, an alkyl group, an aralkyl group, an aryl group, an alkoxy group, an aralkyloxy group, an aryloxy group, an acyl group, an alkoxycarbonyl group, an aralkyloxycarbonyl group, an aryloxycarbonyl group, an amino group, an amide group, or a hydrocarbon thio group; and $R^3$ and $R^4$ may be bonded to each other.

* * * * *